United States Patent
Wang et al.

(10) Patent No.: US 8,827,352 B2
(45) Date of Patent: Sep. 9, 2014

(54) BUMPER RETENTION SYSTEM

(75) Inventors: Chen-Shih Wang, Troy, MI (US); Hamid G. Kia, Bloomfield Hills, MI (US); John N. Owens, Franklin, MI (US); Elisabeth J. Berger, Farmington Hills, MI (US); Venkat Aitharaju, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/408,048

(22) Filed: Feb. 29, 2012

(65) Prior Publication Data

US 2013/0221692 A1    Aug. 29, 2013

(51) Int. Cl.
*B60R 19/26* (2006.01)

(52) U.S. Cl.
USPC ..................... 296/187.03; 293/133

(58) Field of Classification Search
USPC .............. 296/187.03, 187.09, 187.1, 187.11; 293/133, 154, 155, 135–137, 132
See application file for complete search history.

(56) References Cited

U.S. PATENT DOCUMENTS

| 5,116,092 A * | 5/1992 | Schonleber | 293/132 |
| 5,914,163 A * | 6/1999 | Browne | 428/36.1 |
| 6,062,355 A * | 5/2000 | Nohr et al. | 188/374 |
| 2012/0146348 A1* | 6/2012 | Di Modugno | 293/133 |

FOREIGN PATENT DOCUMENTS

DE        102006008068        *  2/2006

* cited by examiner

*Primary Examiner* — Dennis H Pedder
*Assistant Examiner* — Beverly Becker
(74) *Attorney, Agent, or Firm* — Parks IP Law LLC; Mickki D. Murray, Esq.

(57) ABSTRACT

A system for controlling displacement of a vulnerable component in connection with an impact event at the system. The system includes a frame structure, the vulnerable component, and a composite crush member (a) connected to the frame structure and the vulnerable component, forming a first close connection between the composite crush member and the vulnerable component and a second close connection between the composite crush member and the frame structure, (b) comprises primarily a polymer composite and is configured, and (c) is arranged in the system to fail in a predetermined manner in response to the impact event. The system also includes a retention feature configured and connected, directly or indirectly, to the vulnerable component and to the frame structure to, in operation of the system, maintain at least one of the first close connection and the second close connection during and following the composite crush member the impact event.

21 Claims, 22 Drawing Sheets

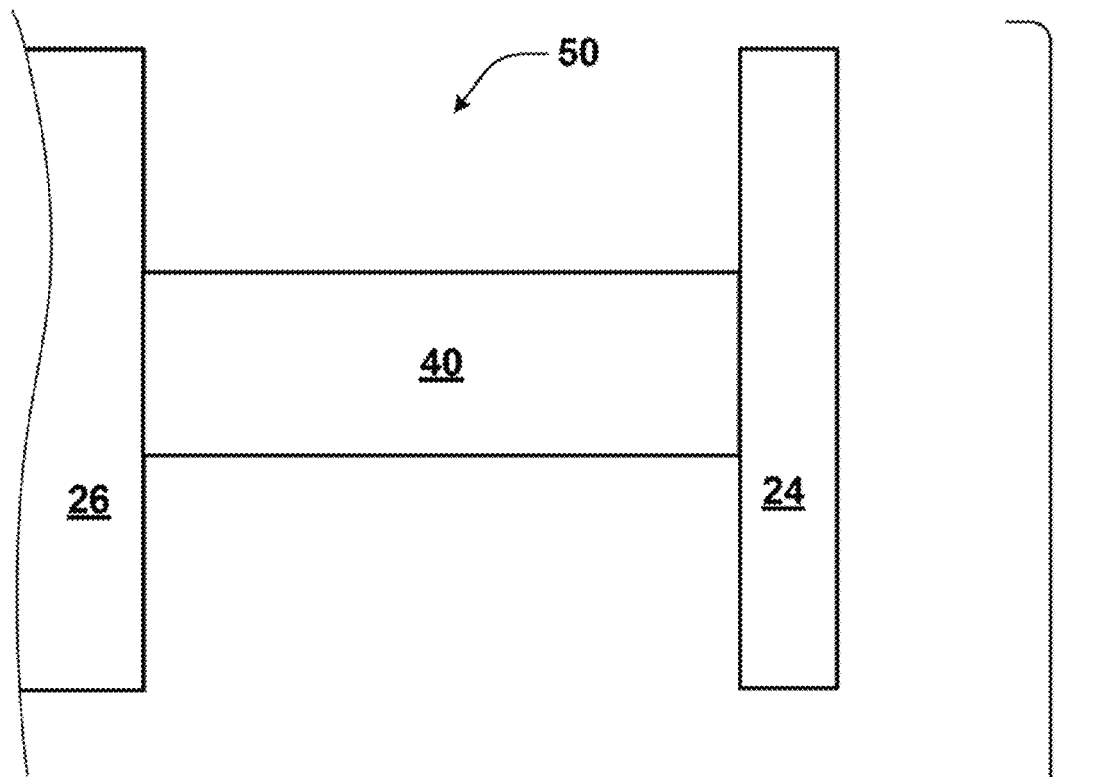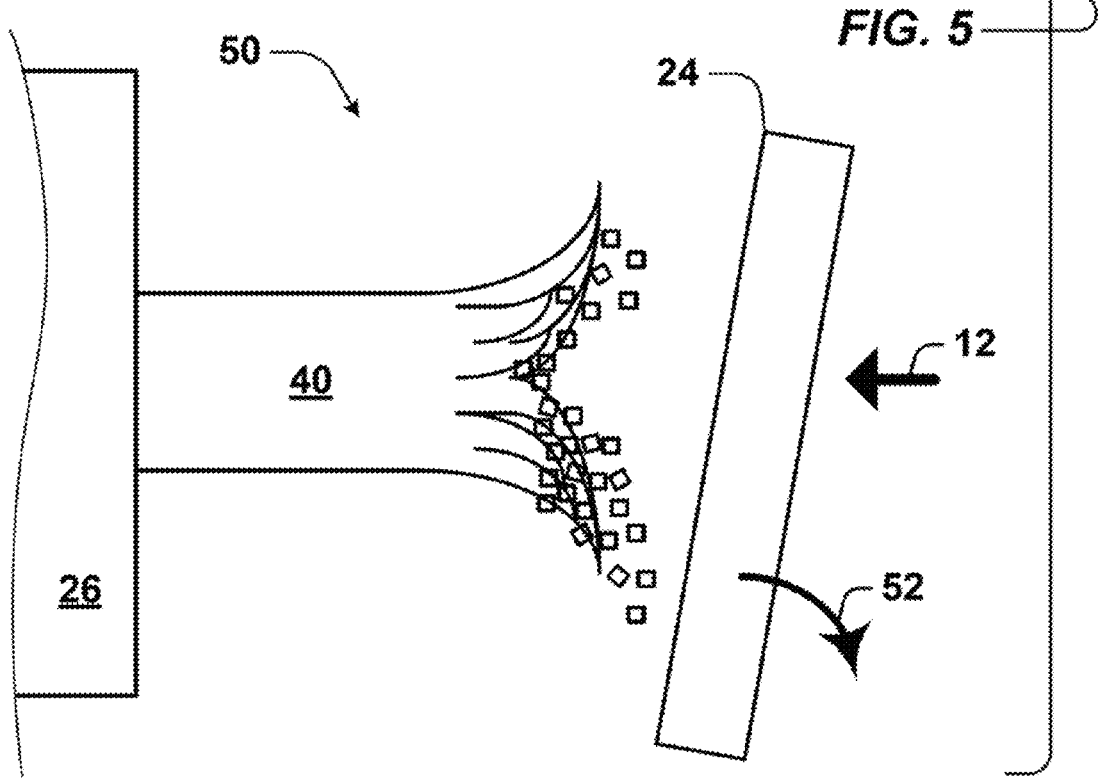
FIG. 5

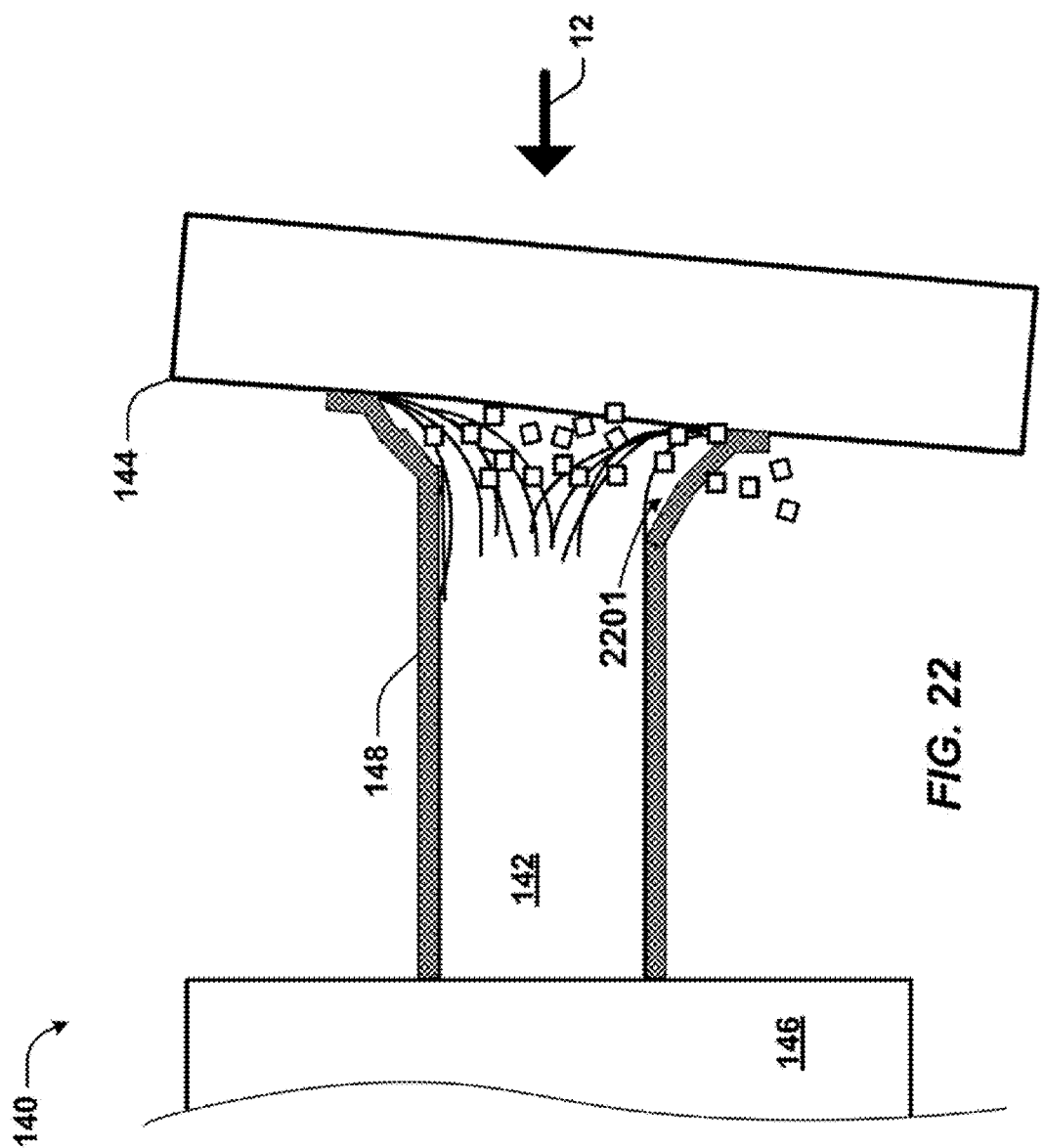

BUMPER RETENTION SYSTEM

TECHNICAL FIELD

The present disclosure relates generally to systems for retaining a bumper intact in connection with an impact event and, more particularly, to systems for retaining a vehicle bumper.

BACKGROUND

In recent years, high-performance, lightweight materials have been developed for use in automobiles. These materials are in many cases lighter, meet at least the same level of safety, and are in some case stronger. Example high-performance materials are fiber-reinforced composites.

One application for such materials is as a bumper crush member, in some case referred to as a crush can or simply a can. The crush member extends between a primary vehicle structural component, such as a frame rail, and an extended bumper member. The crush member is configured and arranged on the automobile to absorb energy in the event of an impact to the bumper.

Crush members are typically made of metal, such as aluminum. In the future, many automobiles will likely have crush members made of a high-performance material such as a fiber-reinforced composite.

The manner by which crush members made of such a composite absorb impact energy is quite different than the manner by which conventional metal crush members absorb energy. Metal members absorb energy by folding and/or pleating.

Now turning to the figures, and more particularly to the first figure, FIG. 1 shows a metal member 10 pleating to absorb energy in an impact event. The impact force in the example of FIG. 1 is coming from the right of the figure, as indicated by an arrow marked by reference numeral 12.

By the failure mechanism of metal members (folding and/or pleating), a crush zone 14 is created. If the crush can does not completely fail, the member will retain a generally unaffected zone 16, adjacent the crush zone 14. Although the crush zone can have different lengths 18, depending on a configuration of the bumper system, including materials thereof, and characteristics of the impact (e.g., direction(s) and magnitude(s) of force(s)), in many instances the length 18A of the crush zone will be less than one inch and can in some cases be a few centimeters.

FIG. 2 shows schematically the same crush member 10 of FIG. 1 installed as part of a bumper system 20 prior to an impact event. The bumper system 20 includes at least the crush member 10 and can be considered to include one or both of a bumper 22 and a primary frame structure 24, such as a front vehicle rail. The crush member 10 connects the bumper 22 to the frame structure 24. The bumper 22 can be, for example, an aluminum extrusion bumper beam.

FIG. 3 shows the system 20 of FIG. 2 immediately following an impact event involving an impact force 12 applied, from right to left in the figure, to the bumper 22. The impact force 12 can result from the automobile contacting an object, such as another vehicle or street-side pole, at the location of the bumper 22.

As shown, the failure mechanism of the metal crush member 10 is to pleat as well as fold or bend (note the bending downward). As also shown, the crush member 10 can stay connected to the bumper 22, thus keeping the bumper 22 connected to the frame structure 24.

Composite members, on the other hand, absorb energy by more significant structural changes, such as by fragmenting and/or splaying, the latter possibly including peeling away/outward in the crush zone, forming fronds. A composite member having a polymeric resin or matrix, for example, can micro-fracture into tiny bits during failure. Some of the fibers may break off and, commonly, fibers will bend away or splay from the primary input force (e.g., the force 12 in FIG. 2.

FIG. 4 shows a first composite member 40 splaying and fragmenting to absorb energy. The impact force in the example of FIG. 4 is also coming from the right of the figure and indicated by an arrow 12.

FIG. 4 shows a crush zone 44 formed by the fragmenting failure mechanism. Although the crush zone 44 for such members 40 can have other lengths 48, depending on a configuration of the bumper system (e.g., materials thereof, dimensions of the member 40, and characteristics of the impact (e.g., direction(s) and magnitude(s)), the length 48 is in some embodiments expected to in many cases be up to about two inches, or more. In some embodiments, the length 48 is up to as much as about eight to about ten inches, or even more.

FIG. 5 shows two schematic images of the crush member 40 of FIG. 4 installed as part of a bumper system 50. The first, top, image shows the bumper system 50 prior to an impact event and the second, bottom, image shows the system immediately following the impact.

The bumper system 50 includes at least the crush member 40 and can be considered to include one or both of the bumper 24 and the primary frame structure 26, such as a front vehicle rail. The crush member 40 connects the bumper 24 to the frame structure 26. As shown, the crush member 40 fails in response to the impact, such as by fragmenting.

By their particular failure mechanisms, such as fragmenting or splaying, composite crush members can absorb more energy than metal members and can exhibit a greater crush distance, while taking up about the same or less space as conventional metal crush members. For instance, fiber-reinforced composites have been found in some cases to have a specific energy absorption of about two, three, or even up to five or more times that of metal members.

Though the failure behavior allows for greater energy absorption and crush distance, the behavior destroys or otherwise disables initial attachment points between the member and the bumper, leaving no structural components keeping the bumper connected to primary automobile frame. The bumper element thus becomes displaced considerably from its original position with respect to the primary automobile frame and in some cases could fall off of the vehicle completely.

As also shown in FIG. 5, the failure of the crush member 40 causes a disconnect between the crush member 40 and the bumper 24. The bumper 24 is thus disconnected from the frame structure 26 and may fall away from the bumper system 40, as shown by an arrow 52 in FIG. 5.

Disconnection of the bumper from the frame presents multiple challenges. One is that the bumper could fall or otherwise move out of place, to a position where it cannot absorb additional energy in the event of another impact. As another, a completely detached bumper could conceivably be a hazard.

There is thus a need for a system that maintains a connection between a bumper element and a primary frame member upon failure of a composite bumper member previously connecting the bumper and frame.

SUMMARY

The present disclosure relates to a system for controlling displacement of a vulnerable component in connection with an impact event at the system. The system includes a frame structure, the vulnerable component, and a composite crush member. The composite crush member is connected to the frame structure and the vulnerable component, forming a first close connection between the composite crush member and the vulnerable component and a second close connection between the composite crush member and the frame structure. The composite crush member also comprises primarily a polymer composite and is configured and arranged in the system to fail in a predetermined manner in response to the impact event. The system also includes a retention feature configured and connected, directly or indirectly, to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system.

In another aspect, the disclosure relates to a system for controlling displacement of a vulnerable component in connection with an impact event at the system. The system includes a frame structure and a composite crush member. The composite crush member is connected at a first connection to the frame structure, forming a close connection between the composite crush member and the frame structure, and configured to connect via a second connection to the vulnerable component. The composite crush member also comprises primarily a polymer composite and is configured and arranged in the system to fail in a predetermined manner in response to the impact event. The system also includes a retention feature configured and connected, directly or indirectly, to the frame structure and to the composite crush member to, in operation of the system, maintain the close connection between the frame structure and the composite crush member, during and immediately following the composite crush member failing in the predetermined manner in response to the impact event at the system.

In still another aspect, the disclosure relates to a system for controlling displacement of a vulnerable component, in connection with an impact event at the system, including the vulnerable component and a composite crush member. The composite crush member is connected to the vulnerable component forming a close connection between the composite crush member and the vulnerable component. The composite crush member also comprises primarily a polymer composite and is configured and arranged in the system to fail in a predetermined manner in response to the impact event. The retention feature is configured and connected, directly or indirectly, to the vulnerable component and to the composite crush member to, in operation of the system, maintain the close connection between the vulnerable component and the composite crush member during and immediately following the composite crush member failing in the predetermined manner in response to the impact event at the system.

Other aspects of the present invention will be in part apparent and in part pointed out hereinafter.

DESCRIPTION OF THE DRAWINGS

FIG. 5 illustrates a composite crush member in two scenarios: prior to an impact and immediately after the impact.

FIG. 22 illustrates schematically the system of FIG. 14, following the impact event causing the composite to fail, showing performance of the retention element, including the strap component, for retaining a connection between the bumper and the frame member.

DETAILED DESCRIPTION

Figure 1:
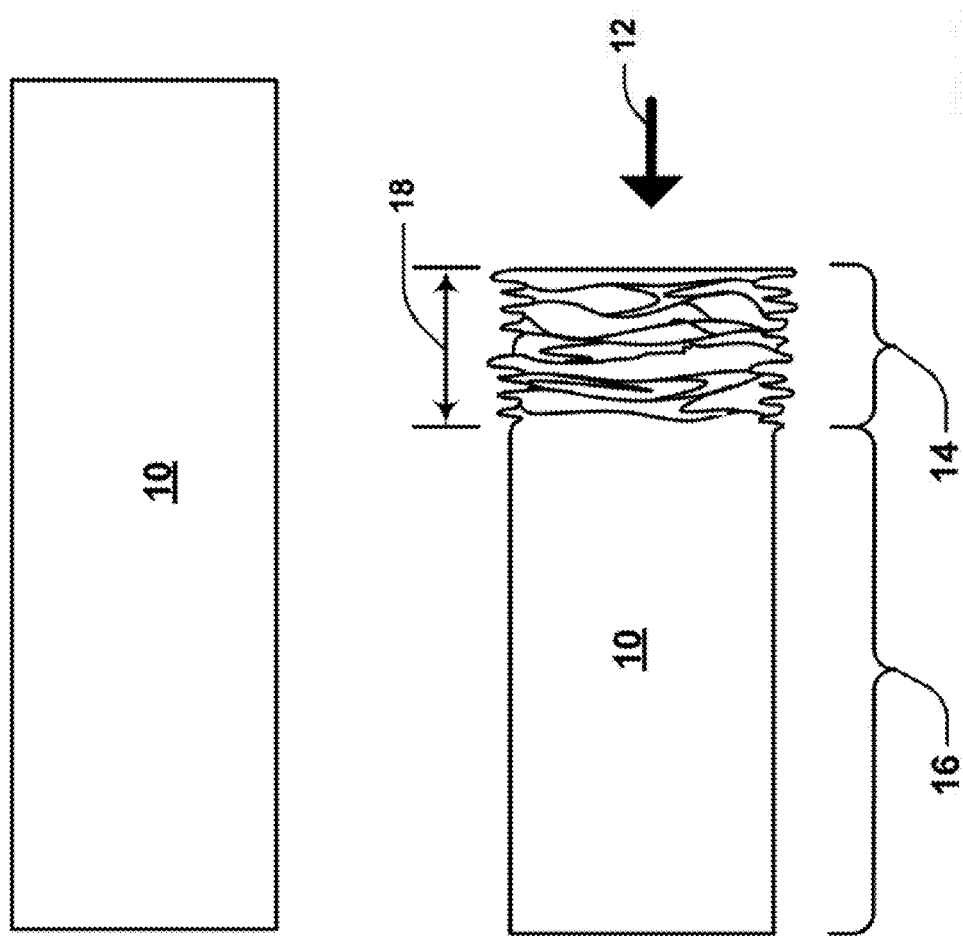
FIG. 1 illustrates a traditional crush member made of metal in two scenarios: prior to an impact and immediately after the impact.
Figure 2:
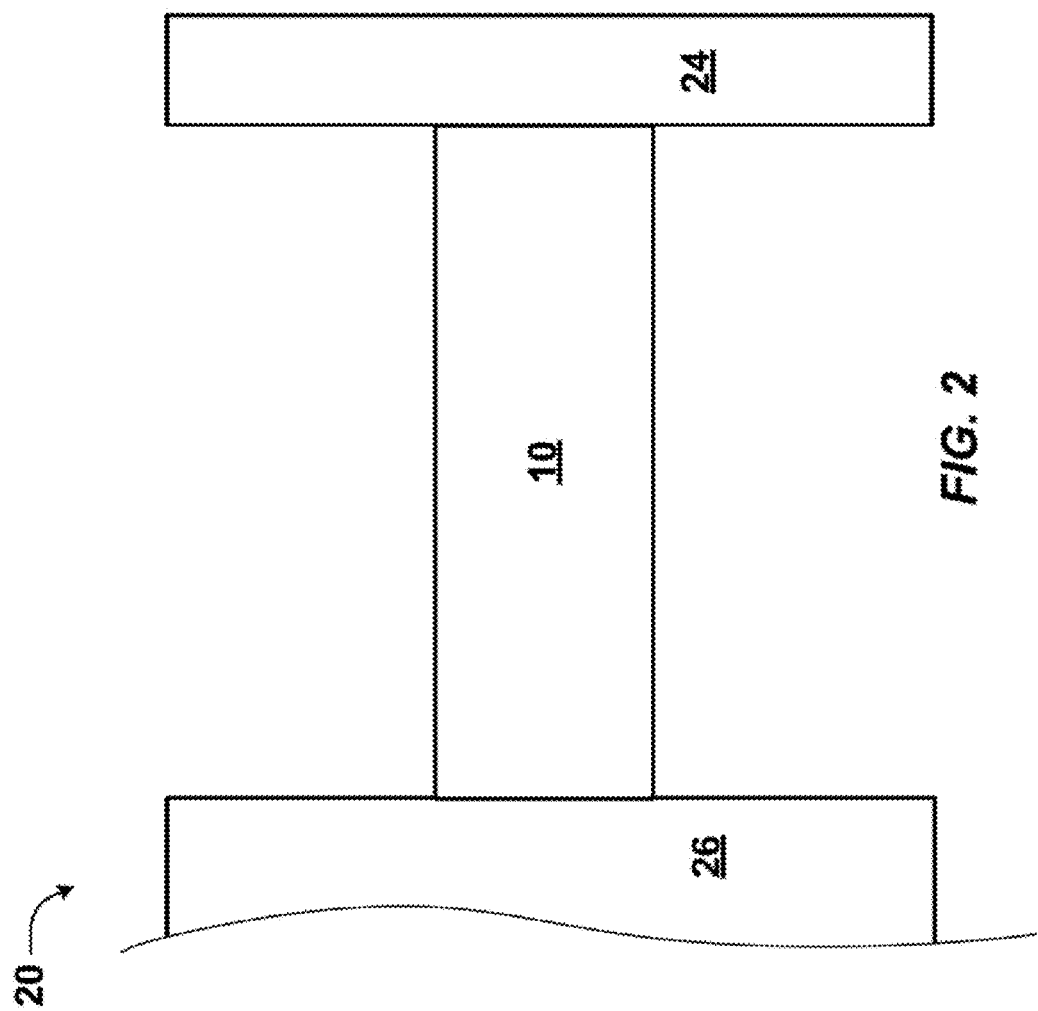
FIG. 2 illustrates schematically a traditional bumper system having the metal crush member connecting a bumper to a frame member.
Figure 3:
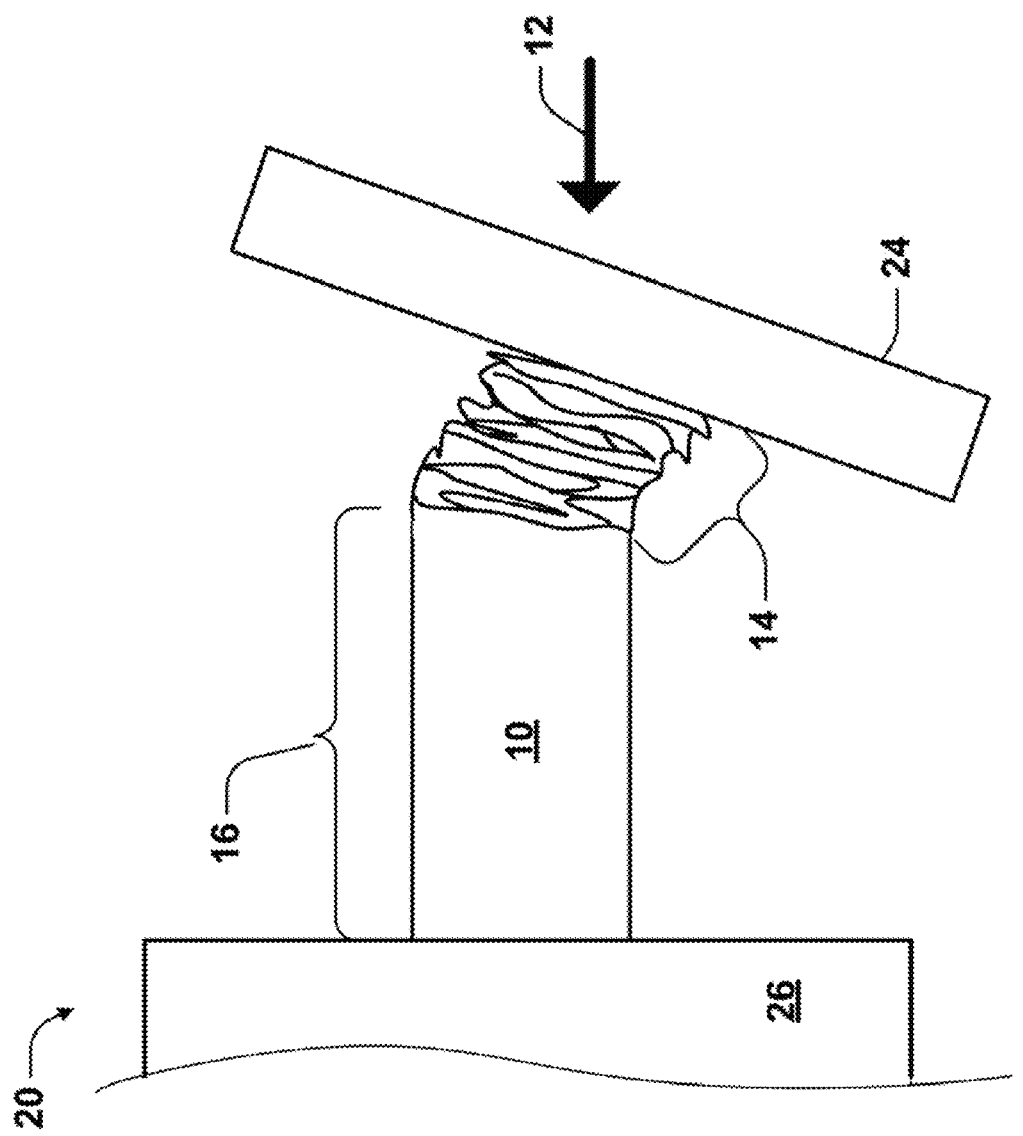
FIG. 3 illustrates schematically the system of FIG. 2 following application of a force resulting in crush member deformation like that of FIG. 1.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Overview of the Disclosure

In various embodiments, the present disclosure describes systems for retaining an automobile bumper in connection with an impact event, such as an automobile accident. The impact force can result from the automobile contacting an object, such as another vehicle or post, at the location of the bumper.

The present technology is described herein primarily in a context of an automobile bumper system. The technology is not limited, though, to implementation with automobiles bumper systems or even to automobiles.

Regarding automobiles, the bumper system shown can be used equally in a fore portion (front bumper system) or aft portion (rear bumper system) of the car.

A crush member is installed as part of a system such as a bumper system. The bumper system includes at least the crush member and can be considered to include one or both of a bumper and a primary frame structure, such as a front or rear vehicle rail. The crush member connects the bumper to the frame structure. The bumper can be, for example, an aluminum extrusion bumper beam.

In some embodiments, it is preferred that the crush member be a polymer composite. The composite is in some cases reinforced with a fibrous material, such as a glass fiber and/or carbon fiber—e.g., carbon-fiber reinforced composite and glass-fiber reinforced composite.

In a contemplated embodiment, the crush member is made of a material, other than a polymer composite, having similar high-performance features: e.g., relatively lightweight and strong, and having a failure mechanism causing the material to become destroyed in such a way that breakage of at least one initial connection between the crush member and an adjacent component (e.g., bumper beam and/or frame structure), such as by fragmenting and/or splaying, as do polymer composites.

The system also includes one or more retention elements or features configured and arranged on, at, around, in, and/or as part of the system to maintain some sort of connection between the bumper and the frame structure in the event of an accident breaking an initial connection between the crush member and the bumper and/or the crush member and the frame structure.

Many of the embodiments described below have analogous or otherwise similar or related features to each other. Generally, characteristics of parts described herein in connection with any part can apply to analogous parts of other embodiments, including outside of such analogies or relationships pointed out expressly.

FIG. 6

Figure 6:
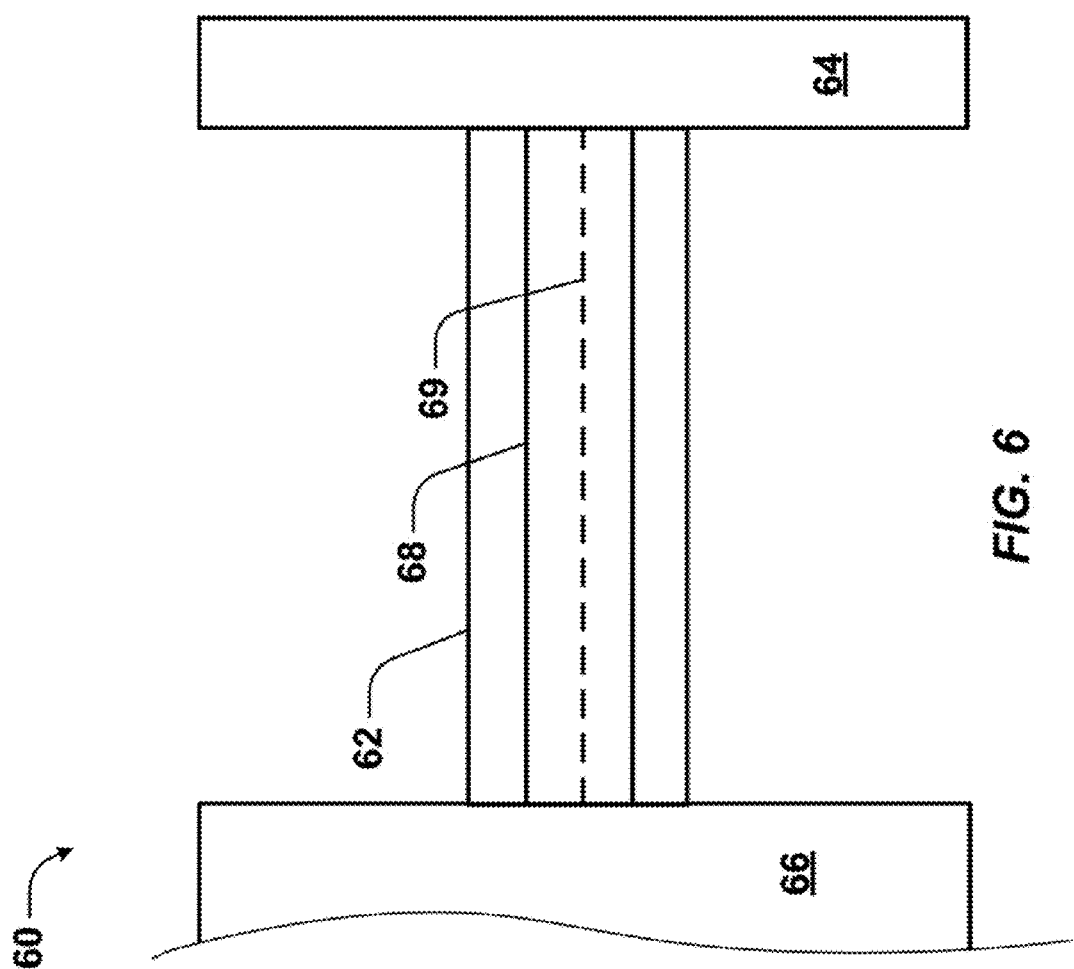
FIG. 6 illustrates schematically a system according to the present technology, prior to an impact event, having a retention element or feature for ensuring connection between a frame structure and a bumper member despite a composite crush member, initially connecting the frame structure and bumper member, being at least partially destroyed by the impact event in a way that compromises a connection between the crush member and one or both of the bumper member and the frame structure.

Turning again to the figures, and more particularly to the sixth figure, FIG. 6 illustrates schematically a system 60, intact, prior to an impact event. Although the system 60 can be referred to generally as a bumper system, the term bumper is not used in a limiting sense, and the technology can be implemented in systems that do not include or relate to what may be commonly referred to as a bumper.

The system 60 includes or is associated with a crush member 62 connecting a vulnerable component 64—e.g., vehicle bumper beam, to a primary structure 66. The system 60 includes a retention element or feature 68, which, along with all features described, is shown schematically in the figures.

The component 64 is vulnerable in that without operation of the retention element 68, the component 64 would likely, or more likely, become completely disconnected from the frame structure 66 in the event of an impact.

In the context of automobiles, the component 64 can be a bumper beam, such as an aluminum extrusion bumper beam. Though the component 64 is referred to often herein using the term, bumper, the component 64 is not limited to being a bumper beam, or bumper-like element.

The term frame need not be limit the structure to being a part of what might conventionally referred to as a frame, such as of an automobile or other vehicle or apparatus. The frame structure 66 could be a frame, an extension of a frame, or connected to a frame, for instance. Notwithstanding the terminology used to describe the structure 66, it is that part to which the vulnerable component 64 is initially connected, and the part to which the retention element 68 is designed to ensure that the vulnerable component 64 stays connected in the event of an impact event.

The retention element 68 is illustrated schematically in FIG. 6 to represent the presence of the element 68, but the element is not limited to the schematic size, position in the system, and shape shown. The retention element 68 is not limited to having an elongate shape, for instance. More detail about the retention element 68 is provided herein further with respect to FIG. 6 and embodiments having particular example retention elements illustrated in FIGS. 7-22.

The retention element 68 is configured (e.g., having a size, shape, position, and material) within the system 60 to ensure connection between a frame structure and a bumper member despite a composite crush member initially connecting the structure and member being at least partially destroyed by the impact event.

In some embodiments, it is preferred that the system 60 be configured so that the retention element 68 operate to maintain a relatively-close connection between the bumper element and the frame structure, and particularly between the bumper element and the crush member 62. Close connections are shown by way of example in FIGS. 15-22, wherein a direct connection between the bumper element 64 and the crush member 62 is maintained. The close connection between the bumper element 64 and the crush member 62, though, need not cause the bumper element 64 and the crush member 62 to be directly connected to each other—e.g., there may be a small space between them following the impact event. The close spacing between the bumper element 64 and the crush member 62 shown in FIGS. 15-22 is shown schematically and the bumper element 64 can be kept even closer to, or be allowed to move a little farther from, the crush member 62, while maintaining the close connection. By the close connection, not only is the bumper element kept from falling from the system 60, but also possibly kept in place enough to be able to absorb additional energy in the event of a subsequent impact event. It will be appreciated that the subsequent impact event could be associated with a common accident involving the first impact event. For instance, a vehicle could impact a first vehicle at its front bumper causing the vehicle to turn to a position where the front bumper then is hit by a second vehicle.

The views of the figures are also not limiting in terms of perspective. The views are presented to foster comprehension of the invention and not to limit the technology. For instance, the views shown are not limited to being a side view, a cross-sectional side view, a partial side cross-section, a top plan view, top cross-section, a partial top cross-section, etc. Rather, the views are presented schematically and generically to encompass any of these and other such views that one of ordinary skill in the art would understand that the figures could represent. FIG. 6 is considered to show, for instance, a crush member 62 being solid, completely hollow, or partially hollow, such as by having one or more hollow elongate compartments.

As provided, the crush member 62 can be referred to colloquially as a crush can or can. The crush member 62 can also be referred to colloquially as an end clip in connection with embodiments of the technology in which the crush member 62 is positioned generally at or adjacent an end of an apparatus, such as at or adjacent a front or fore end of an automobile (hence, the member could be referred to as a front end clip, for example) or at or adjacent a back, rear, or aft end of the automobile (hence, the member could be referred to as a rear end clip, for example).

In some embodiments, the member 62 is elongate and/or includes a polymer composite. As provided, the composite is in some cases a carbon-fiber reinforced composite and/or a glass-fiber reinforced composite. In some embodiments, the member 62 preferably has high-performance features, such as by being relatively lightweight and strong, and has a failure mechanism, such as by at least partially fragmenting and/or splaying, destroying material of the member 62 in a way that breaks at least one initial connection between the member 62 and at least one of the bumper beam 64 and the frame structure 66.

The crush member 62 is in some embodiments configured and/or arranged to facilitate, initiate, or cause a specific failure scenario. An example scenario is having the crush member fail at one end (usually the end adjacent the bumper beam 64) before the other end. In one embodiment, this is accomplished by employing a trigger feature into the crush member. The trigger feature can include a condition rendering the crush member stronger in some portions than others, thereby allowing for failure at weaker portions before stronger portions.

The trigger feature in a particular embodiment includes a beveled edge formed selectively at a portion of the crush member, such as at or adjacent the bumper-beam end of the crush member. The beveled feature will cause failure of the crush member to initiate at or adjacent the beveled feature.

In one embodiment, the trigger feature includes one or more notches formed, such as by a saw, on a surface of the crush member closer to and/or adjacent an end of the crush member desired to fail first, such as at or adjacent the bumper-beam end of the crush member.

The trigger feature can also include making the crush member thinner selectively in one or more areas and/or forming the crush member to have weaker material in one area as compared to another.

The crush member 62 is not limited in terms of shape, size, material, etc. outside of having characteristics it needs to have to perform effectively to absorb energy sufficiently in the case of a crash event. The member 62 can have any common or to-be determined features for crush members. As an example, the crush member 62 can have flanges on one or more than one side of the crush member, such as on opposite sides of the crush member and/or internal to the crush member, as described further below. Flanges are considered shown schematically in FIG. 6 via reference numeral 69.

The descriptions herein with respect to the crush member should be understood to encompass this broad understanding of the crush member 62. For instance, the description below describing the retention traps/brackets of FIGS. 11-13 should be understood to encompass embodiments in which the described trap walls extend to and/or over such flanges. As another example, the description below regarding retention straps/sashes in connection with FIG. 14 should be understood to encompass embodiments in which the straps are position on and/or adjacent such flanges.

While some adjacent components are described and/or shown herein as being connected and others are described and/or shown as being formed integrally together (e.g., being parts of the same piece), the present disclosure is meant to be interpreted to also encompass embodiments in which the other type of connections can be made. For instance, where two components are described or shown as separate parts connected to each other, they can be integrally formed. And two parts shown or described herein as being integrally formed can be formed by two or more separate pieces.

FIG. 7

Figure 7:
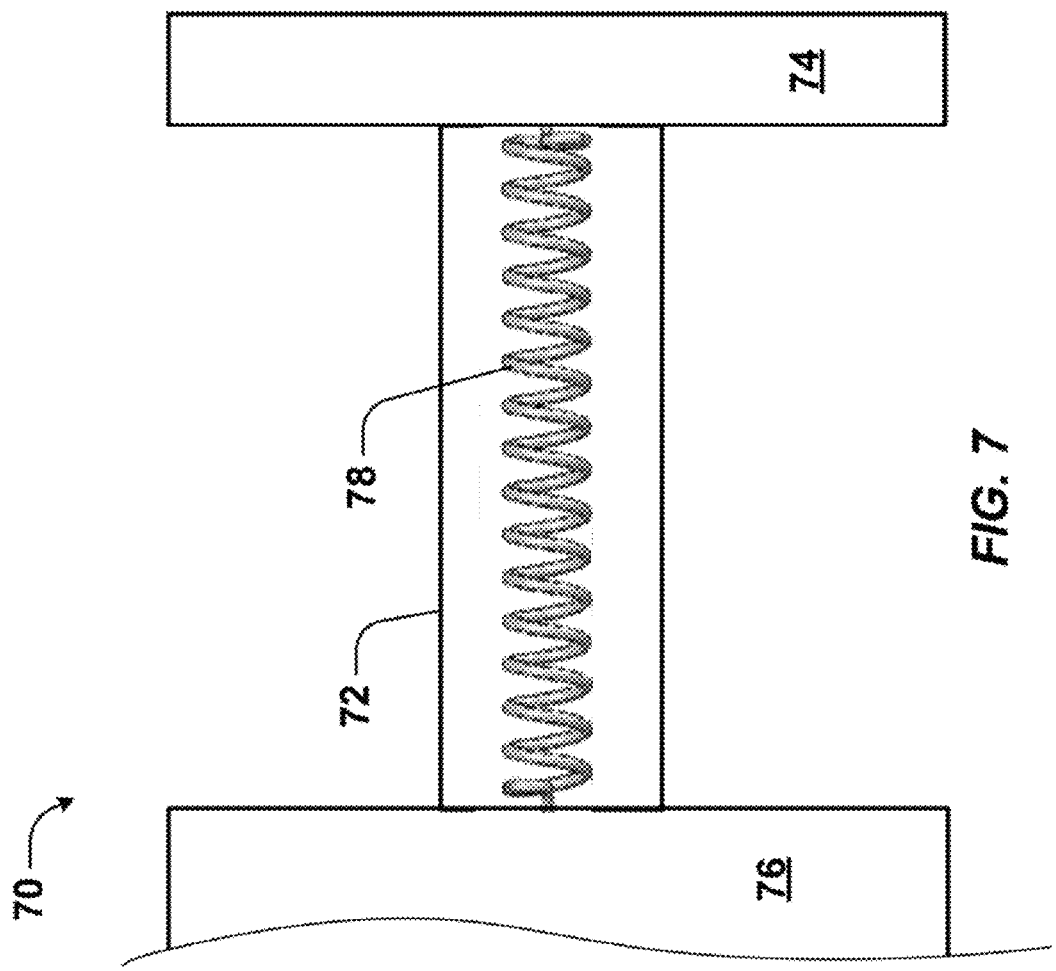
FIG. 7 illustrates schematically a particular example of a bumper system like that of FIG. 6, prior to an impact event, wherein the retention element includes a spring component.

FIG. 7 illustrates schematically a particular embodiment of a bumper system 70, like the system 60 of FIG. 6, prior to an impact event. In this embodiment, the retention element 68 (of FIG. 6) includes a spring component 78.

The spring component 78 is connected, directly or indirectly, at a first end of the spring component to a frame structure 76. In FIG. 7, the spring component 78 is shown connected directly to the frame structure 76. The frame structure 76 of this embodiment is generally the same as the frame structure 76 described above in connection with the general embodiment of FIG. 7.

In a contemplated embodiment, the spring component 78 does not at its first end connect directly to the frame structure 76, but connects to the frame structure by way of intermediate material, such as that of the crush member 72. In this contemplated embodiment, the spring component 78 is rigidly connected directly to intermediate material (e.g., crush member 72), such as by being embedded within, or positioned within a hollow or interior of and connected to, the crush member 72. In this embodiment the spring component 78, e.g., extends toward, but stops short of extending all the way to, the frame structure 76. The intermediate material is in turn directly or indirectly connected to the frame structure 76, thereby connecting the spring component 78 to the frame structure 76. Such an indirect connection (between the spring component 78 and the frame structure 76) is allowed when the connections between (a) the intermediate material (e.g., crush member 72) and the frame structure 76 and (b) the spring component 78 and the intermediate material are not expected to (e.g., designed (configured and arranged) not to) break in response to an impact event.

The spring component 78 is connected, directly or indirectly, at a second end of the spring component to a bumper element 74. The bumper element 74 of this embodiment can be generally the same as the vulnerable element 64 described above in connection with the general embodiment of FIG. 6.

Connections described herein, such as the connection between the spring component 78 and the bumper element 74 can be made in any of a variety of ways. For brevity, only example connection types are mentioned, and detail about connections is not provided in association with each connection referenced herein. Example connections include weld, rivet, screw, nut and bolt, industrial glue/adhesive, bonding, melding, fusion such as by melting, others, and the like.

The spring component 78 may be any of a wide variety of spring or spring-like devices. In FIG. 7, the spring component 78 is shown by way of example to include a helical (coil) or a tension spring. In other detail, the spring component 78 may include without limitation any one or more of springs referred to as tension, conical, constant pitch, hour-glass, variable-pitch, barrel, magazine, torsion, volute, extension, extended, round-wire, square or rectangular wire, etc., and the like.

The spring component 78 can be positioned during manufacture at any of a variety of positions with respect to the crush member 72. As described above in the section describing FIG. 6 and the other figures, the views of the figures of the present application are not limiting in terms of perspective, and the views are presented to foster comprehension of the invention and not to limit the technology. For instance, the views shown are not limited to being a side view, a cross-sectional side view, a partial side cross-section, a top plan view, top cross-section, a partial top cross-section, etc. Rather, the views are presented schematically and generically to encompass any of these and other such views that one of ordinary skill in the art would understand that the figures could represent.

FIG. 7 is to be considered to show various optional positions of the spring component 78 with respect to the crush member 72. These positions include the spring component 78 being embedded within, or positioned within a hollow or interior of, the crush member 72, or otherwise positioned within the crush member 72, and/or positioned adjacent the crush member 72. And FIG. 7 is considered to show various distinct embodiments in which the spring component 78 extends all the way to (i) the frame structure 76 and the bumper element 74 and (ii) one of the frame structure 76 and the bumper element 74.

As provided, the crush member 72 is in some embodiments configured and/or arranged to facilitate a specific failure scenario, such as by being stronger in some portions and not others, thereby allowing for failure at the weaker portions before stronger portions. As an example, if it is desired for the crush member 72 to fail (e.g., fragment or splay) at the first end but not the second end in case of an impact event, then the first end can be designed to be thicker and/or otherwise stronger, such as by including a stronger material (e.g., stronger composite material), as compared to the second end.

Each retention element (generally identified by reference numeral 68 in FIG. 6) is, as also referenced, configured (e.g., having a size, shape, position, and material) within the system (60, generally) to ensure connection between a frame structure (66, generally) and a bumper member (64, generally) despite the crush member (62, generally) being at least partially destroyed, by the impact event, in a way that compromises connection between the crush member and one of the bumper element and the frame structure.

Figure 15:
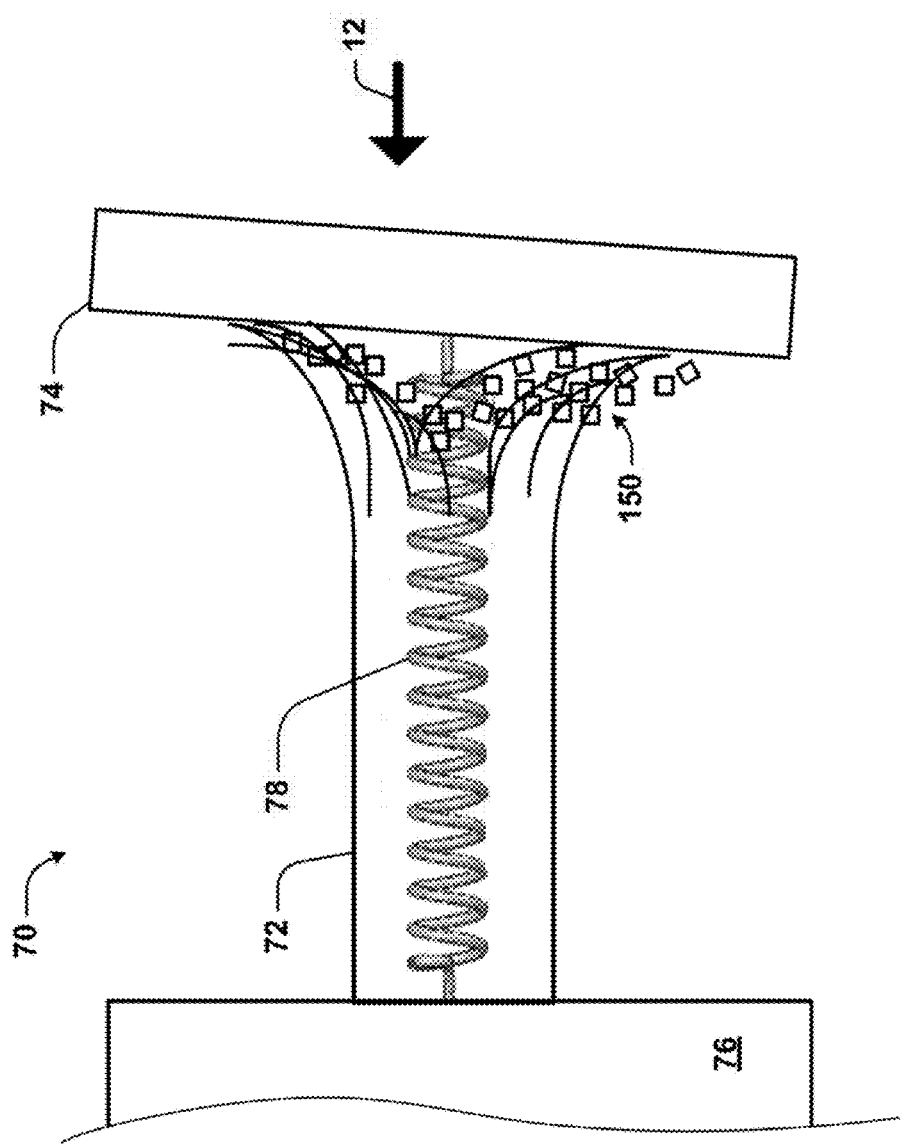
FIG. 15 illustrates schematically the system of FIG. 7, following the impact event causing the composite to fail, showing performance of the retention element, including the spring component, for retaining a connection between the bumper and the frame member.

Regarding the exemplary system 70 of FIG. 7, this operation, function, or process of the spring component 78, to maintain connection between the bumper element 74 and the frame structure 76 in the event of an impact event, is shown and described further herein with reference to FIG. 15.

Parts (e.g., the crush member 72) of the system 70 of FIG. 7 can otherwise be the same as analogous components (e.g., the crush member 62 of FIG. 6) described herein.

FIG. 8

FIG. 6 illustrates schematically a particular embodiment of a bumper system 80, like the system 60 of FIG. 6, prior to an impact event. In this embodiment, the retention element 68 (of FIG. 6) includes a cable or cord-like retention component 68.

Figure 8:
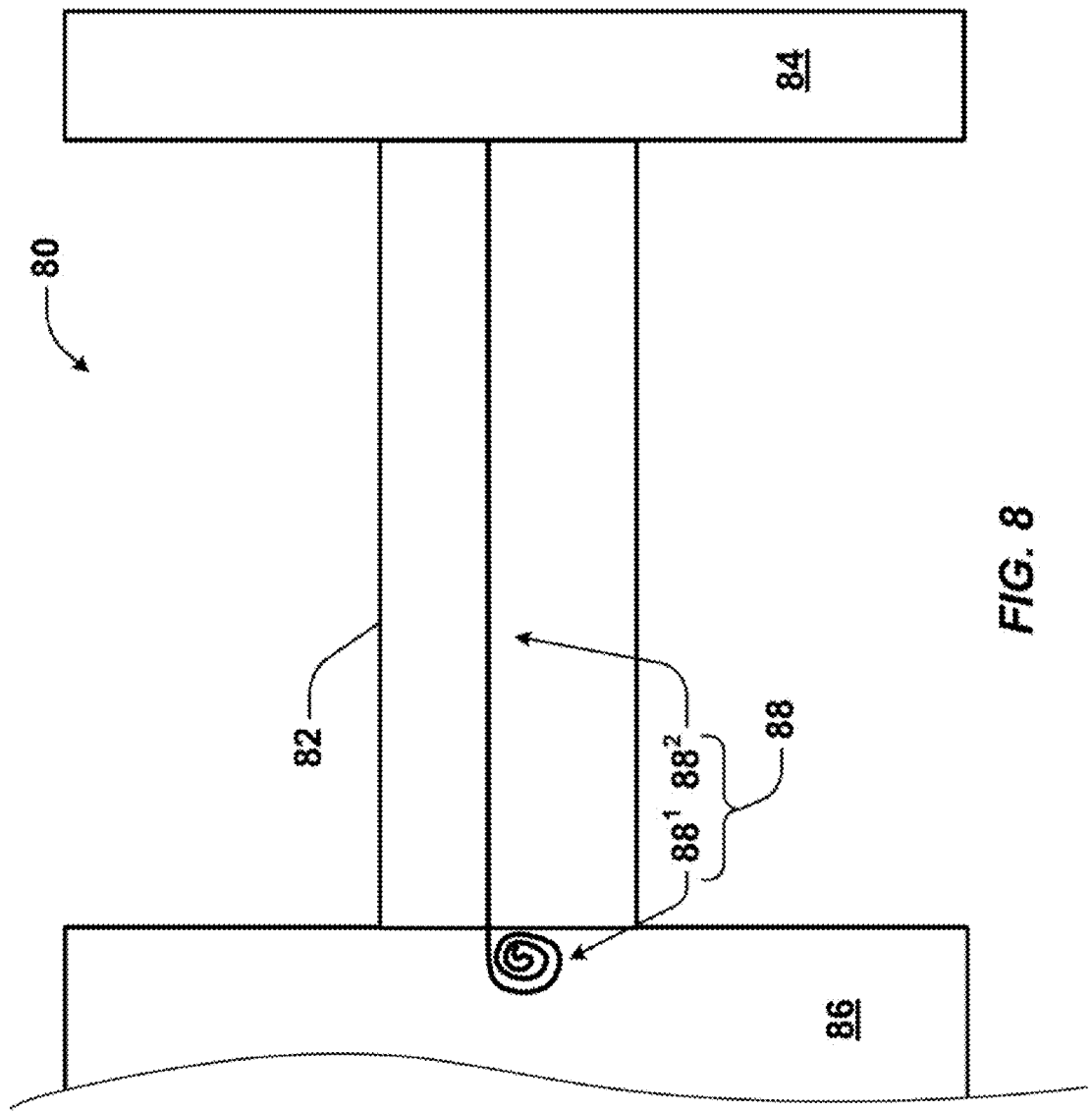
FIG. 8 illustrates schematically a particular example of a bumper system like that of FIG. 6, prior to an impact event, wherein the retention element includes a cable component.

Similar to the example of the spring component 78 (FIG. 7), the retention component 88 of this embodiment is connected, directly or indirectly, at a first end of the retraction component 88 to a frame structure 86. In FIG. 8, the retention component 88 is shown connected directly to the frame structure 86. The frame structure 86 of this embodiment is generally the same as the frame structure 66 described above in connection with the general embodiment of FIG. 6.

In a contemplated embodiment, the retention component 88 does not at its first end connect directly to the frame structure 86, but connects to the frame structure by way of intermediate material such as that of the crush member 82. In this contemplated embodiment, the retention component 88 is rigidly connected directly to intermediate material (e.g., crush member 82), such as by being positioned within a hollow or interior of the crush member 82.

The intermediate material is in turn directly or indirectly connected to the frame structure 86, thereby connecting the retention component 88 to the frame structure 86. Such an indirect connection (between the retention component 88 and the frame structure 86) is allowed when the connections between (a) the intermediate material (e.g., crush member 82) and the frame structure 86 and (b) the retention component 88 and the intermediate material are not expected to (e.g., designed (configured and arranged) not to) break in response to an impact event.

The retention component 88 is connected, directly or indirectly, at a second end of the spring component to a bumper element 84. The bumper element 84 of this embodiment can be generally the same as the vulnerable element 64 described above in connection with the general embodiment of FIG. 6.

In a contemplated embodiment, the second end of the retention component 88 does not at its second end connect directly to the bumper element 84, but connects to the bumper element 84 by way of intermediate material such as that of the crush member 82. As regarding the analogous contemplated embodiment related to the first end of the spring component, in this contemplated embodiment relating to the second end, the retention component 88 is rigidly connected directly to intermediate material (e.g., crush member 82), such as by being or positioned within a hollow or interior of, the crush member 82.

The intermediate material is in turn directly or indirectly connected to the bumper element 84, thereby connecting the retention component 88 to the bumper element 84. Such an indirect connection (between the retention component 88 and the bumper element 84) is allowed when the connections between (a) the intermediate material (e.g., crush member 82) and the frame structure 86 and (b) the retention component 88 and the intermediate material are not expected to (e.g., designed (configured and arranged) not to) break in response to an impact event.

The retention component 88 of the present embodiment may be any of a wide variety cable, cord, or cable or cord-like devices. While in one embodiment the component 88 includes, preferably, a cable, per se, in some embodiments the component 88 includes a device that, while operating essentially like a cable, is not what might be conventionally referred to as a cable. For instance, the component 88 may be or include what might be referred to as a type of spring, such as a clock spring.

The cable component 88, in various embodiments, has any of various sizes, shapes, positions, and material without departing from the scope of the present disclosure, and the term cable does not limit these characteristics. The retention component 88 can be, for instance, any one or more of generally rectangle (e.g., generally square) or cylindrical-profiled, elongate, insulated, non-insulated, flattened or film-like, etc., and the like. The component 88 can include, for instance, a metal, such as a metal alloy—e.g., aluminum.

The retention component 88 can be positioned during manufacture with any of a variety of positions with respect to the crush member 82. As described above, the views of the figures of the present application are not limiting in terms of perspective, and the views are presented to foster comprehension of the invention and not to limit the technology. For instance, the views shown are not limited to being a side view, a cross-sectional side view, a partial side cross-section, a top plan view, top cross-section, a partial top cross-section, etc. Rather, the views are presented schematically and generically to encompass any of these and other such views that one of ordinary skill in the art would understand that the figures could represent.

FIG. 8 is to be considered to show various optional positions of the retention component 88 with respect to the crush member 82. These positions include one or more of the retention component 88 or positioned within a hollow or interior of, the crush member 82, bumper element 84, and/or frame structure 86 or otherwise positioned within one or more of these parts. The retention component 88 could also, or alternatively, be positioned adjacent the crush member 82. The retention component 88 can be, for instance, partially within and partially outside of the crush member 82. FIG. 8 is considered to show these various embodiments.

FIG. 8 is considered to show various embodiments in which the retention component 88 extends all the way to (i) the frame structure 86 and the bumper element 84 and (ii) one of the frame structure 86 and the bumper element 84

The retention component 88 is retractable. The retractable nature of the component 88 can be effected by any of a variety of features $88^1$ without departing for the scope of the present technology. FIG. 8 shows a coiled or tension-spooled feature $88^1$, for effecting the retractable nature of the component 88, such as a wound spring. The retractable feature $88^1$ (e.g., coiled feature) is configured and arranged to take up any slack that is created or would otherwise be created, in response to an impact event, in an extended portion $88^2$ of the component 88. Thus, the feature $88^1$ could include any form of device or arrangement that would take up slack, whether spring-like or not.

In a contemplated embodiment, all or a portion of the retention element 88 has a tension in its body, not being a spring (the spring case covered in connection with the embodiments of FIGS. 7 and 15). In this embodiment, the retention element 88 can be any elongate device able to be put in tension, such as a cord or cable including an elastomer or other stretchable material having memory qualities creating the tension making the material seek to return to an original shape remembered.

When material of the crush element 82 is displaced by the failure mechanism (fragmenting or splaying), the bumper element 84 can then move toward the frame structure 86, and so the body of the retention element 88 contracts, in an original biasing direction, to pull the bumper 84 toward the frame 86.

As provided, the crush member 82 is in some embodiments configured and/or arranged to facilitate a specific failure scenario, such as by being provided with a triggering feature (e.g., beveled edges, scored, or notches), thereby initiating earlier failure at the weaker portions corresponding to the triggering feature.

Each retention element (generally identified by reference numeral 68 in FIG. 6) is, as also referenced, configured (e.g., having a size, shape, position, and material) within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 16:
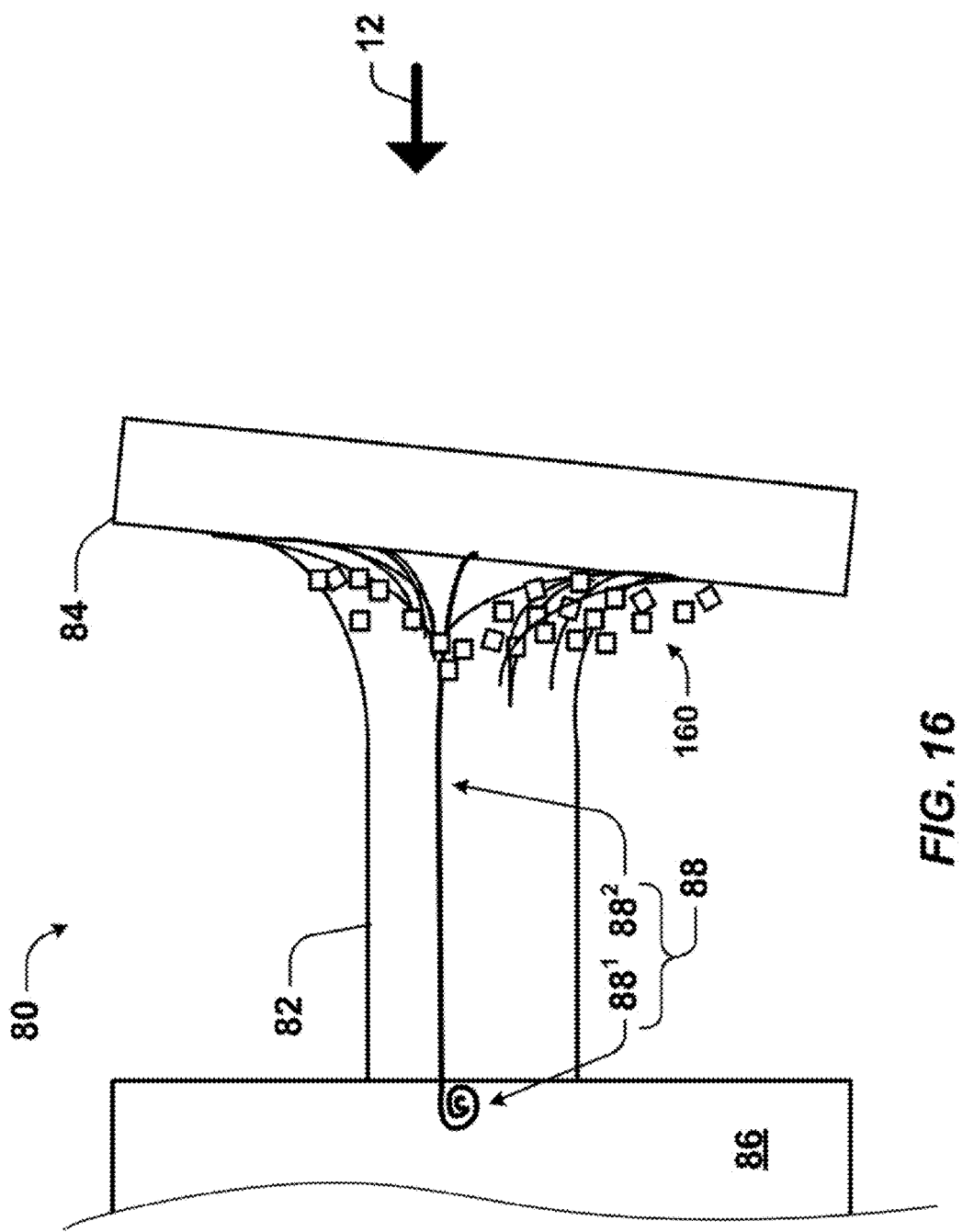
FIG. 16 illustrates schematically the system of FIG. 8, following the impact event causing the composite to fail, showing performance of the retention element, including the cable component, for retaining a connection between the bumper and the frame member.

Regarding the exemplary system 80 of FIG. 8, this operation, function, or process of the retention component 88, to maintain connection between the bumper element 84 and the frame structure 86 in the event of an impact event, is shown and described further in connection with FIG. 16.

Parts (e.g., the crush member 82) of the system 80 of FIG. 8 can otherwise be the same as analogous components (e.g., crush member 62, 72, etc.) described herein.

FIG. 9

Figure 9:
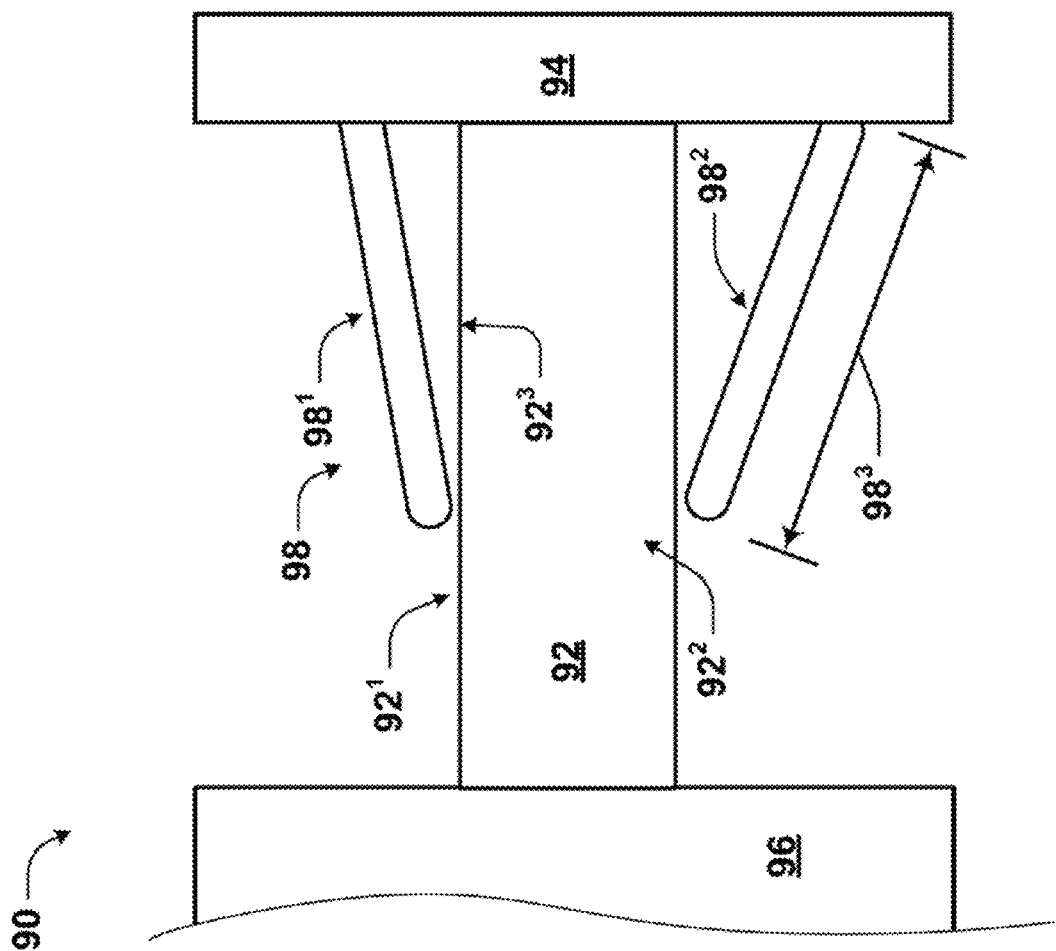
FIG. 9 illustrates schematically a particular example of a bumper system like that of FIG. 6, prior to an impact event, wherein the retention element includes a guide-design sub-system.

FIG. 9 illustrates schematically a particular embodiment of a bumper system 90, like the system 60 of FIG. 6, prior to an impact event. In this embodiment, the retention element 68 (of FIG. 6) includes a guide-design sub-system 98.

The guide sub-system 98 includes one or more guide components, illustrated in FIG. 9 by reference numerals $98^1$, $98^2$. In the illustrated embodiment, the guide components $98^1$, $98^2$ are connected to and extend from a bumper element 94. The bumper element 94 of this embodiment can be generally the same as the vulnerable element 64 described above in connection with the general embodiment of FIG. 6, and the other bumper elements described herein.

Although the guide components $98^1$, $98^2$ may have other lengths, indicated in FIG. 9 by reference numeral $98^3$, without departing from the scope of the present technology, in one embodiment each guide component $98^1$, $98^2$ has a length $98^3$ between about one inch and about two inches, and in some cases more than two inches.

In a contemplated embodiment, the sub-system 98, and so the system 90, includes other similar guide components (not shown expressly) extending from the frame structure 96. The frame structure 96 of this embodiment can be generally the same as the frame structure 66 described above in connection with the general embodiment of FIG. 6.

The guide components can have any of a variety of sizes, shapes, positions, and materials without departing from the present invention. The guide components can have any of various levels of rigidity, from very rigid to at least somewhat flexible. In the illustrated example, the guide components $98^{1,}$ $^2$ are shown schematically, for purposes of general teaching, as being elongate and substantially straight. They can, though, for example, have a bend in them.

As described above, the views of the figures of the present application are not limiting in terms of perspective, and the views are presented to foster comprehension of the invention and not to limit the technology. For instance, the views shown are not limited to being a side view, a cross-sectional side view, a partial side cross-section, a top plan view, top cross-section, a partial top cross-section, etc. Rather, the views are presented schematically and generically to encompass any of these and other such views that one of ordinary skill in the art would understand that the figures could represent. FIG. 9 is to be considered, for instance, to show schematically related deviations, such as the guide components being at least partially curved.

In various embodiments, the guide components $98^{1,\ 2}$ include one or more of a variety of materials without departing from the scope of the present invention. The guide components can include, for example, metal (e.g., a metal alloy), a plastic, or a polymer composite.

Although FIG. 9 shows the guide components being positioned outside of and adjacent an exterior surface $92^3$ of the crush member 92, in a contemplated embodiment the one or more guide components are positioned instead, or also, in an interior $92^4$ of the crush member adjacent an inner surface $92^5$ of the crush member 92. Under this arrangement, in case of a crash event, and fragmentation of the crush member 92 adjacent the guide members 98, one or more of the internal guide members 98 engage the inner surface $92^5$ of the crush member for maintaining a connection between the crush member 92 and the part (e.g., bumper element 94 or frame structure 96), and so between the frame structure 96 and the bumper element 94.

As provided, the crush member 92 is in some embodiments configured and/or arranged to facilitate a specific failure scenario, such as by being stronger in some portions and not others, thereby allowing for failure at the weaker portions before stronger portions. As an example, if it is desired for the crush member 92 to fail (e.g., fragment or splay) at the first end before other parts of the member, a trigger feature may be provided (e.g., bevel and/or scoring).

Each retention element (generally identified by reference numeral 68 in FIG. 6) is, as also referenced, configured (e.g., having a size, shape, position, and material) within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 17:
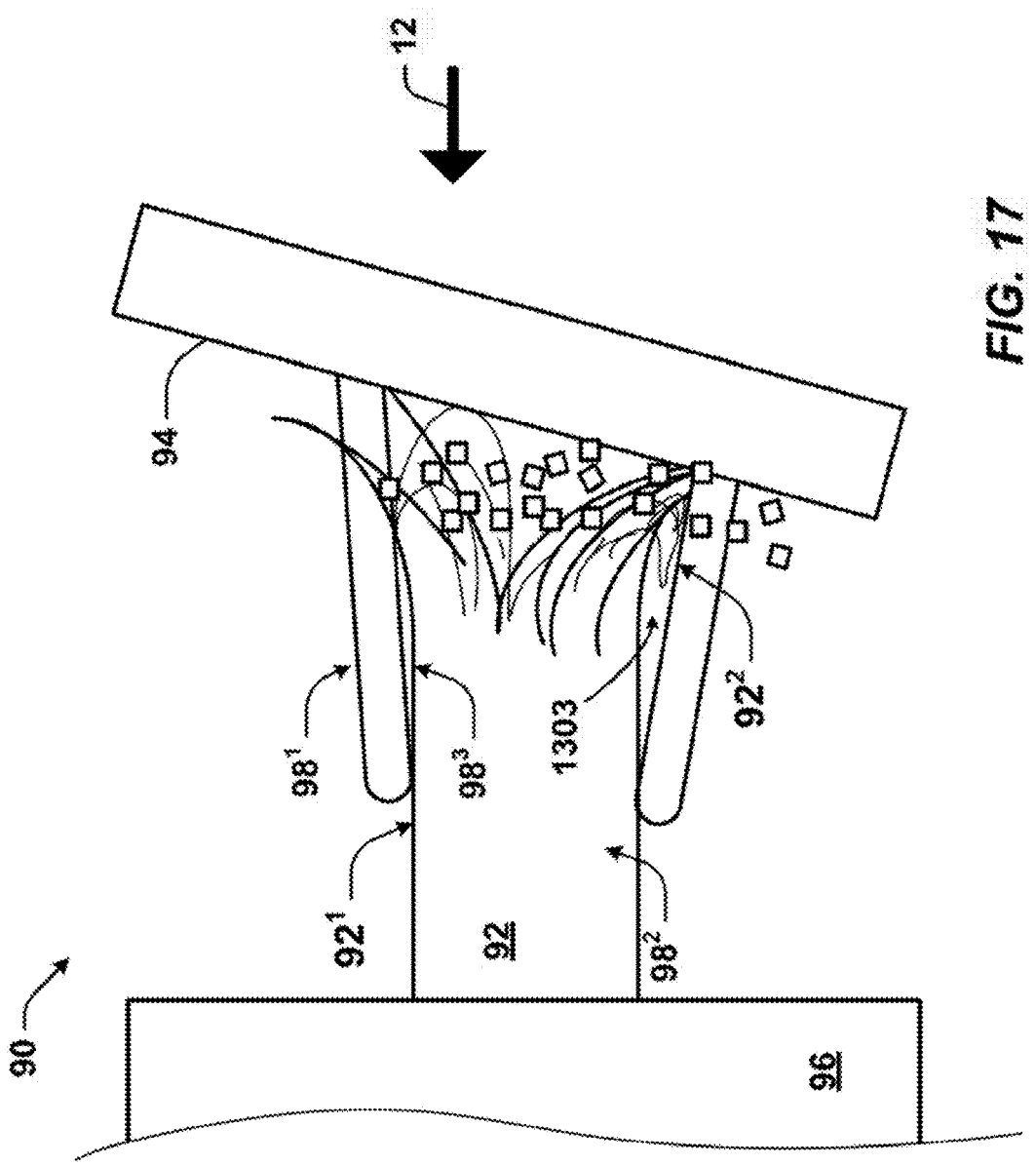
FIG. 17 illustrate schematically the system of FIG. 9, following the impact event causing the composite to fail, showing performance of the retention element, including the guide-design sub-system, for retaining a connection between the bumper and the frame member.

Regarding the exemplary system 90 of FIG. 9, this operation, function, or process of the guide-design subsystem 98, to maintain connection between the bumper element 94 and the frame structure 96 in the event of an impact event, is shown and described further in connection with FIG. 17.

Parts (e.g., crush member 92) of the system 90 of FIG. 9 can otherwise be the same as analogous components (e.g., crush member 62, 72, etc.) described herein.

FIG. 10

Figure 10:
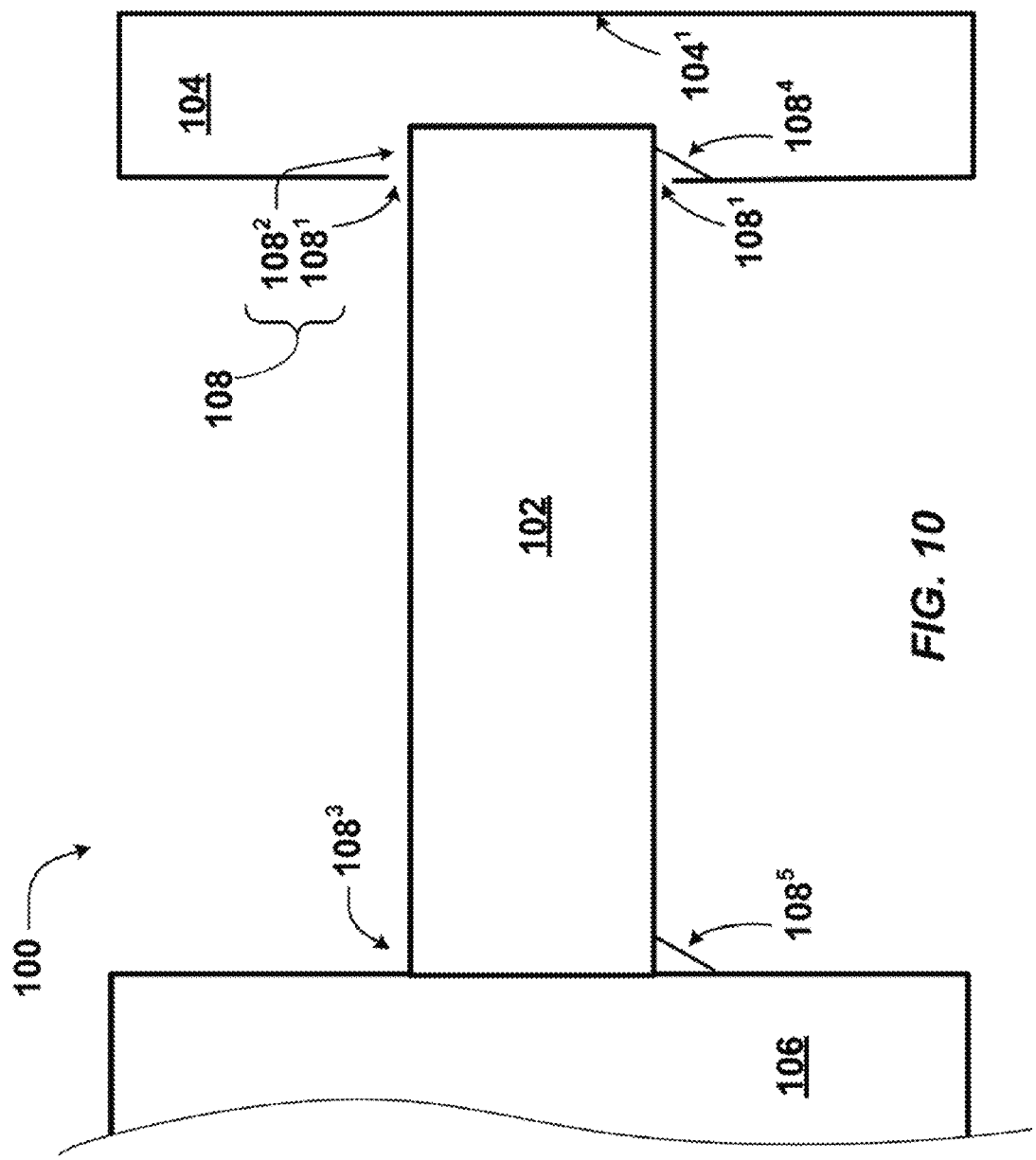
FIG. 10 illustrates schematically a particular example of a bumper system like that of FIG. 6, prior to an impact event, wherein the retention element includes a slotted bumper beam for receiving the crush member.

FIG. 10 illustrates schematically a particular embodiment of a bumper system 100, like the system 60 of FIG. 6, prior to an impact event. In this embodiment, the retention element 68 (of FIG. 6) includes a feature 108 allowing the crush member to enter a hollow of at least one of a bumper element 104 and a frame structure 106.

In FIG. 10, the feature 108 is shown schematically to include a slot $108^1$ in the bumper element 104 adjacent a first end $108^2$ of a crush member. First and second ends $108^3$, $108^3$ of the crush member 102 are not limited to being the very tips of the member 102, and can refer to a certain length of the member 102, such as the first about 5% to about 25% of the member at its respective ends.

In a contemplated embodiment, the retention feature 108 includes a similar slot (not shown in detail) in the frame structure, for receiving a second end $108^3$ of the crush member 102.

The slot $108^1$ is sized and shaped so that an adjacent end $108^2/108^3$ of the crush member 102 is slidably connected to the slot or at least can slide through or farther through the slot during an impact event.

As provided, FIG. 10 shows an initial arrangement of the system 100, prior to an impact event (e.g., automobile accident). Although the slot $108^1$ is shown as being open (i.e., uncovered), and receiving the first end $108^2$ of the crush member 102, in this pre-impact-event state, the bumper element 104 slot is, in various embodiments, so that the first end $108^2$ is positioned adjacent the slot $108^1$, including the following: (i) open and receiving a first end $108^2$ of the crush member 102 in a pre-event state, (ii) open and not receiving the first end $108^2$ of the crush member 102 in the pre-event state, or (iii) partially or completely covered, such as by an easily-breakable, with the first end $108^2$ entering the slot to a degree or completely outside of the bumper element in the initial state 104.

For the contemplated embodiment in which the retention feature 108 includes a slot in the frame structure 106, the frame structure slot is likewise, in various embodiments, open and receiving the second end $108^3$ of the crush member 102 in a pre-event state, open and not receiving the second end $108^2$ of the crush member 102 in the pre-event state, or partially or completely covered, such as by an easily-breakable film, with the first end $108^2$ entering the slot $108^1$ to a degree or completely outside of the bumper element 104 in the initial state.

Connections between the crush member 102 and each of the bumper element 104 and frame structure 106 are indicated schematically in FIG. 10 by reference numerals $108^4$ and $108^5$. While the connections are shown in a certain single location, it will be appreciated that one or more such connections can be provided there and/or in other locations between the crush member and the bumper element and/or the frame structure. And, as referenced above, connections described herein can be made in any of a variety of ways and example connections include weld, rivet, screw, nut and bolt, industrial glue/adhesive, melding, fusion such as by melting, others, and the like. Further, it is contemplated that connections described herein can be accomplished by the respective parts being formed integrally together. The connection is in some embodiments configured to be readily broken, in response to the impact event, so that the force form the impact is concentrated, not on areas of the connection, but at an end of the crush member 102, such as between the first end of the crush member and an aft surface of the bumper element 104.

In some embodiments associated with at least FIG. 10, one or more of the connections between the crush member 102 and the one or both of the bumper element 104 and the frame structure 106 are configured and/or arranged to be breakable under a relatively low predetermined amount of force. The relatively low breaking force allows the crush member 102 to enter the respective adjacent component/s (bumper element and/or frame structure) as part of a designed failure scenario. The connection can break at any point, such as in an intermediate part (between the crush member 102 and adjacent part 102/106) and/or at the local portion of the crush member, where the connection is made to the adjacent part.

In a contemplated embodiment, the retention element 108 further includes one or more projections (e.g., flexible projection(s)), such as those described in connection with FIGS. 11-13. The projections(s) would aid in bumper retention as described in connection with those embodiments and as will be apparent to one skilled in the art upon reviewing the present disclosure.

As referenced above, the crush member is in some embodiments configured and/or arranged to facilitate a specific failure scenario, such as by being stronger in some portions and not others, thereby allowing for failure at the weaker portions before stronger portions. As an example, if it is desired for the crush member 102 to fail (e.g., fragment and/or splay) at the first end $108^2$ but not the second end $108^3$ in case of an impact event, then the first end $108^2$ can be designed to be thicker and/or otherwise stronger, such as by including a stronger material (e.g., stronger composite material), as compared to the second end $108^3$. And the crush member 102 can be designed to fail at both of its ends.

And each retention element (generally identified by reference numeral 48 in FIG. 6) is, as also provided, configured (e.g., having a size, shape, position, and material) within the system (40, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 18:
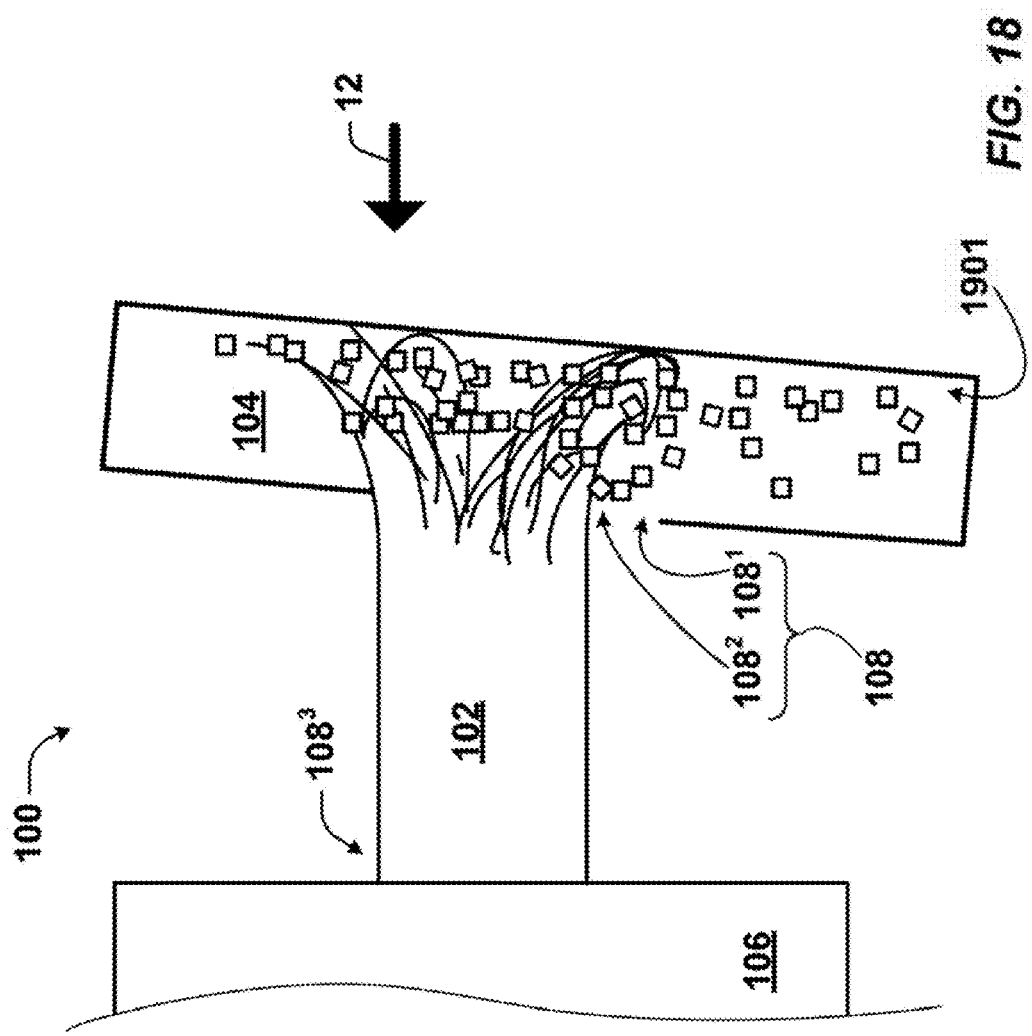
FIG. 18 illustrate schematically the system of FIG. 10, following the impact event causing the composite to fail, showing performance of the retention element, including the slotted bumper beam for receiving the crush member, for retaining a connection between the bumper and the frame member.

Regarding the exemplary system 100 of FIG. 10, this operation, function, or process of the retention feature 108, to maintain connection between the bumper element 104 and the frame structure 106 in the event of an impact event, is shown and described further in connection with FIG. 18.

Parts (e.g., crush member 102) of the system 100 of FIG. 10 can otherwise be the same as analogous components (e.g., crush member 62, 72, etc.) described herein.

FIG. 11

Figure 11:
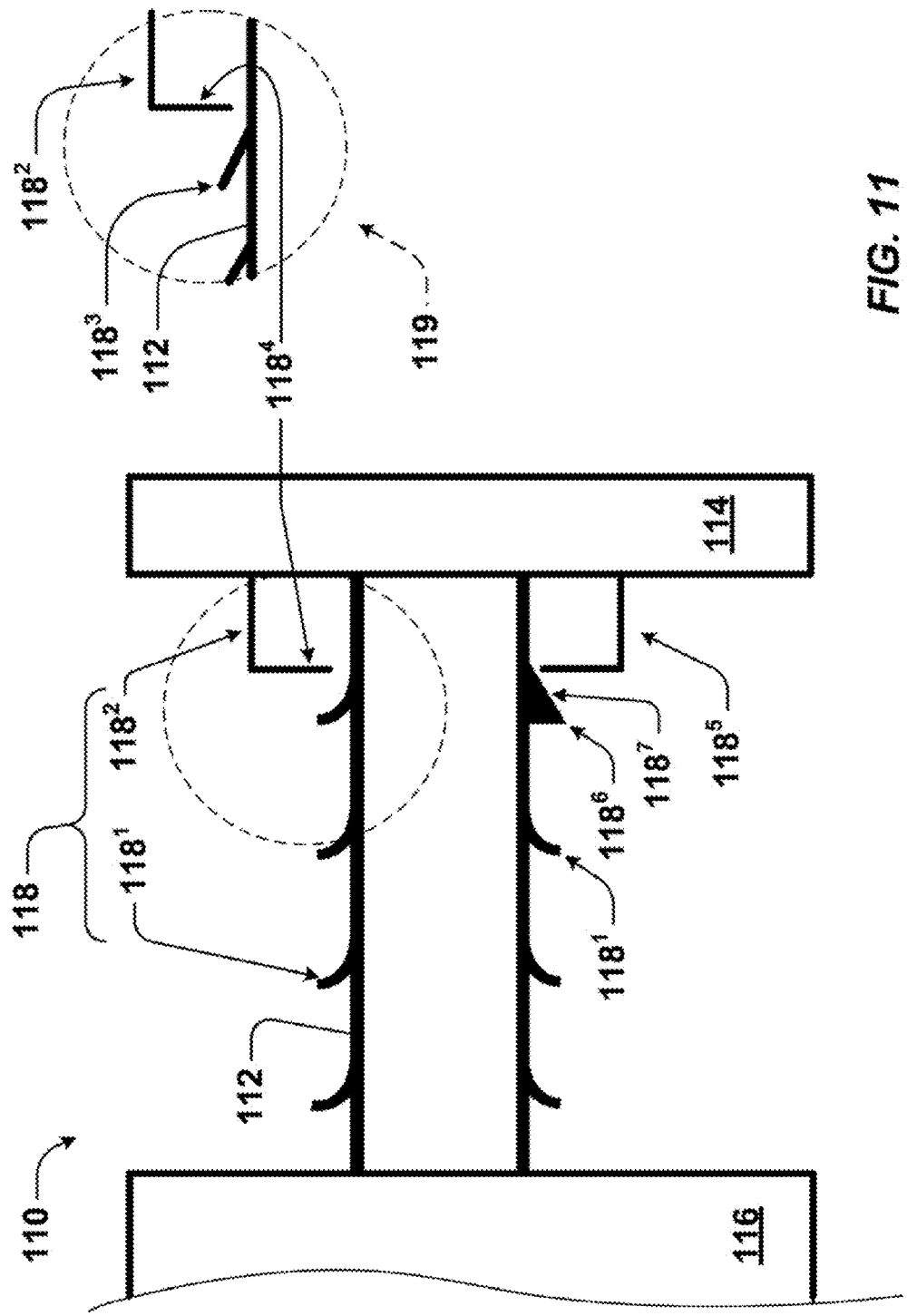
FIG. 11 illustrates schematically a particular example of a bumper system like that of FIG. 6, prior to an impact event, wherein the retention element includes flexible outward-extending projections and a retention bracket.

FIG. 11 illustrates schematically a particular embodiment of a bumper system 110, like the system 60 of FIG. 6, prior to an impact event. In this embodiment, the retention element 68 (of FIG. 6) includes outward-extending projections $118^1$ and a retention bracket or trap $118^2$, referenced collectively by reference numeral 118.

The projections $118^1$ can have any of a variety of sizes, shapes, positions, and materials within the scope of the present disclosure. In one embodiment, at least some of the projections $118^1$ are configured (e.g., sized, shaped, and/or having a material) to have shape memory—e.g., to bounce back after being bent out of an original shape by a force, and then the force released.

In one embodiment, at least some of the projections $118^1$ are configured to be (a) flexible enough so that a distal portion thereof can be easily displaced, by contact with the retention bracket $118^2$, during an impact event, but (b) inflexible or rigid enough to keep the bracket from passing over the projection $118^1$ again. In this way, the projection(s) and bracket act to maintain a connection between the crush member 112 and the bumper element 114 being connected to the bracket $118^1$. This operation will be described further below.

In a contemplated embodiment, a retention bracket (not shown), like bracket $118^2$, is connected to the frame structure 116. For use of this contemplated bracket, the projections, at least one or one set adjacent the frame structure 116 would have an orientation opposite horizontally that that shown. This contemplated projection(s) would also be otherwise configured (e.g., sized, shaped, and/or having a material) to be (a) flexible enough so that a distal portion thereof can be easily displaced, by contact with the contemplated retention bracket (connected to the frame structure), during an impact event, but (b) inflexible enough to keep the bracket from passing over the contemplated projection again. In this way, the contemplated projection(s) and contemplated bracket would act to maintain a connection between the crush member 112 and the frame structure 116 being connected to the contemplated bracket.

As provided above in connection with FIG. 10, the retention element 108 of the embodiment of FIG. 10 can include one or more projections (e.g., flexible projection(s)) like those described in connection with FIG. 11. From the perspective of the embodiment of FIG. 11, it will then be appreciated that instead of or along with including a retention bracket adjacent the bumper element 114 and/or a retention bracket the frame structure 116, the retention element 118 can include a slot in the bumper element 114 and/or a slot in the frame structure 116.

Due to the flexibility of the projections $118^1/118^3$, the trap $118^2$ in the embodiments of FIG. 118, does not need to be flexible to enable the projections $118^1$ to pass into the trap $118^2$.

The retention bracket $118^2$ in some embodiments includes metal. The bracket $118^2$ is not limited in shape outside of generally being shaped to trap one or more of the projections $118^1 \backslash 118^3$. In some cases, the trap $118^2$ completely surrounds the crush member 112. In some cases, the trap $118^2$ completely surrounds the crush member 112 and a connection between the member 112 and the bumper element 114.

In some cases, the trap $118^2$ does not completely surround the crush member 112, but rather meets (e.g., touches or stops adjacent with a space between the trap and crush member) the crush member 112 on one or both of opposite sides of the crush member 112, such as a top and a bottom. In a particular embodiment, the trap $118^2$ meets the crush member 112 at least a top of the crush member 112. FIG. 11 is considered to show all of these scenarios, schematically (e.g., the view can be considered a plan-type of view or a cross-sectional views, for instance, and parts can be removed (e.g., a lower trap portion $118^5$ below the crush member in FIG. 11) without departing from the scope of the present disclosure.

In one embodiment, walls of the trap $118^2$ does not completely surround the crush member 112, but rather meets the crush member 112 at an entirety of two opposite side of the crush member 112, such as a top and a bottom, and each of the two trap walls also overlap to an extent less than 100% to meet third and fourth sides of the crush member 112. In cases in which this overlap extent is relatively small, such as by being less than 50%, the trap walls can be said to form shallow u-shapes or be u-shaped.

As provided above, the crush member 112 can include features such as flanges (shown schematically by reference numeral 69 in FIG. 6). And the trap walls in various embodiments extend to and/or over such flanges.

The projections 118$^1$ are not limited to being rigid, though, and can be flexible to an extent. Each relevant projection 118$^1$/118$^3$ should have sufficient rigidity to keep the projection 118$^1$/118$^3$ from bending back so much that clearance is created allowing a trap wall 118$^4$ to move pass the projection 118$^1$/118$^3$, and thereby allowing the projection 118$^1$/118$^3$ to come out of the trap 118$^2$ and so possibly also allowing the crush member, having the projection 118$^1$/118$^3$, to disconnect from the adjacent part to which the trap is connected—i.e., the bumper element 114 or frame structure 116.

The projections 118$^1$/118$^3$ in various embodiments include any one or more of a wide variety of materials without departing from the scope of the present disclosure. In some embodiments, the projections 118$^1$/118$^3$ include a flexible material such as a plastic or a rubber connected to the crush member 112.

In one embodiment, the projections include a flexible metal or polymer, such as a metal or polymeric spring. In one embodiment, the projections are triangular-shaped and compressible or bendable, with the same memory or bounce-back characteristics. FIG. 11 shows by way of example a triangle-shaped projection 118$^6$. It will be appreciated that the triangular shape would cause the flap 118$^4$ of the trap 118$^5$ to bend enough to allow the projection 118$^6$ to move into the trap 118$^5$ during the crash event, but would not be able to slide back out of the trap 118$^5$ thereafter. The triangular projection and/or projections having other contemplated shapes (e.g., bumps, curved, curved-surface, etc.) could also be used in connection with the other embodiments (e.g., those of FIGS. 12 and 13) described and illustrated in the present application.

Although a single triangle-shaped projection 118$^6$ is shown, the retention element can include any number of these projections 118$^6$, along with or instead of any other of the contemplated projection types, including the curved ones also shown in FIG. 11.

Generally, the material of the relevant projections 118$^1$/118$^3$/118$^6$ are limited only to those that would, assuming an appropriate projection shape, (i) allow the projection to pass into the trap 118$^2$ when the projection and trap have a first direction of relative motion between them, during an impact event, and (ii) keep the projection from moving out of the trap, following the impact event, while the projection and/or the trap may try to move in a second relative direction with respect to each other.

Regarding shape of the projections, each relevant projection 118$^1$/118$^3$/118$^6$ is limited only to shapes that have an ability to, assuming an appropriate projection material, (i) allow the projection to pass into the trap 118$^2$ when the projection and trap have a first direction of relative motion between them, during an impact event, and (ii) keep the projection from moving out of the trap 118$^2$, following the impact event, while the projection 118$^1$/118$^3$/118$^6$ and/or the trap 118$^2$ may try to move, e.g., in a second relative direction with respect to each other. Regarding the deformation of the projections in the first pass, the projections and the trap are in some cases configured so that the projections are substantially flattened against the surface of the crush member, during the impact event, as a result of force from the trap walls moving against the projections, thereby allowing the trap to pass over the generally flattened projections.

Although relevant projections 118$^1$/118$^3$/118$^6$ can have other shapes without departing from the scope of the present invention, in some embodiments, each relevant projection 118$^1$/118$^3$/118$^6$ has a shape selected from a list of shapes consisting of an elongated-curve shape or a triangle shape, as shown in FIG. 11, a bump shape, and an elongated straight shape. FIG. 11 also calls out by dotted circle an optional embodiment wherein a relevant projection 118$^3$ is elongated and generally straight.

Elongated projections 118$^1$/118$^3$, or a contact surface 118$^7$ of triangular projections 118$^6$, extend at an angle from a surface of the crush member. The angle can have any of a wide variety of values without departing from the scope of the present disclosure. In one embodiment, elongated projections 118$^1$/118$^3$ or the contact surface 118$^7$ extend from the crush member 112 surface at an angle of about 90 degrees, or at generally a right angle. In one embodiment, the projections 118$^1$/118$^3$ or the contact surface 118$^7$ extend from the crush member surface at any angle between about 0 degrees and about 90 degrees in either direction (i.e., between about 0 and about 180 degrees). In some embodiments having elongated projections 118$^1$/118$^3$, it is preferred that the projections are, in a pre-impact event state of the system 110, angled away from the trap that they are configured to engage, as shown in the embodiment of FIG. 11.

As referenced above, the crush member is in some embodiments configured and/or arranged to facilitate a specific failure scenario, such as by providing the crush member with a triggering feature (e.g., scoring and/or bevel) to initiate failure at one of the ends of the member before other parts of the member.

Generally, each retention element (generally identified by reference numeral 68 in FIG. 6) is, as also provided, configured (e.g., having a size, shape, position, and material) within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 19:
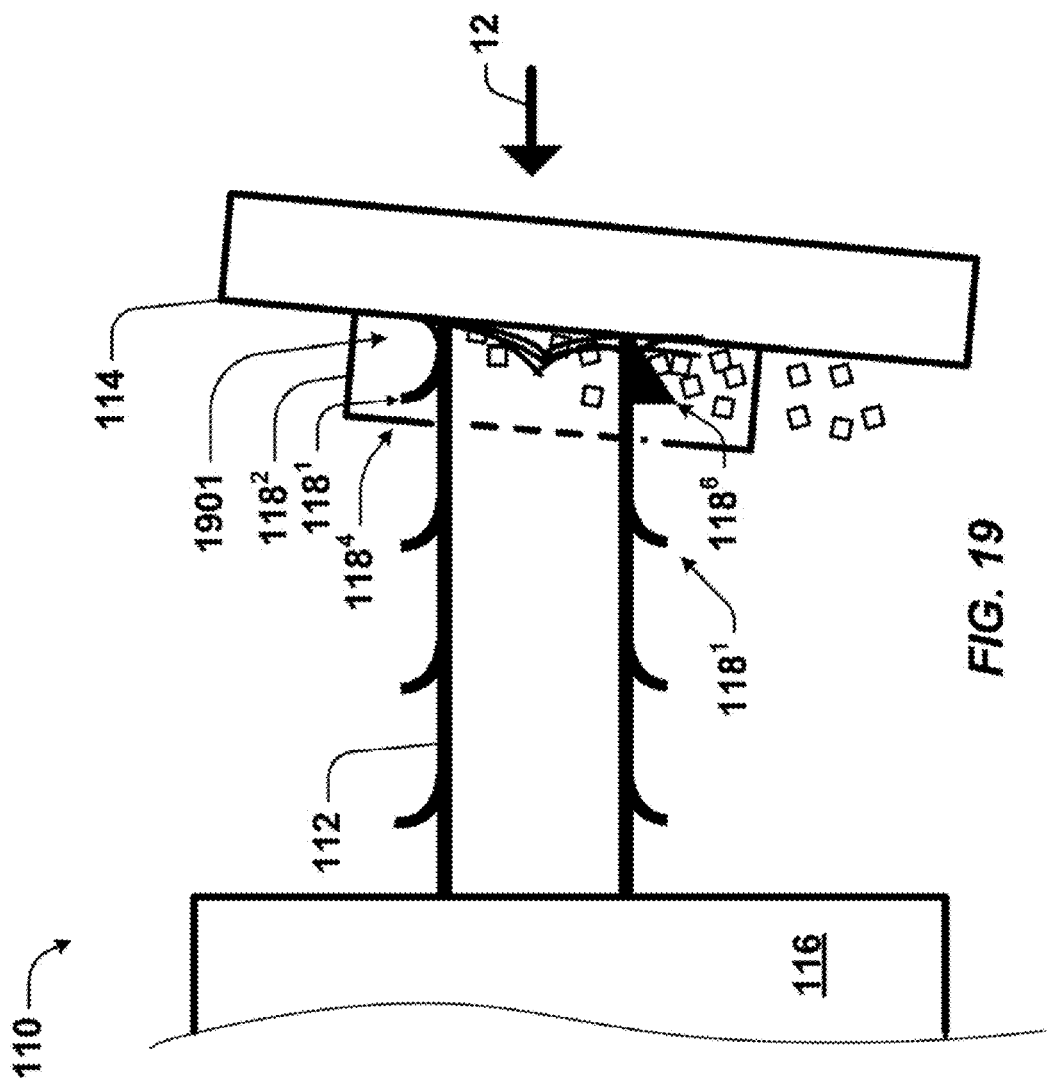
FIG. 19 illustrate schematically the system of FIG. 11, following the impact event causing the composite to fail, showing performance of the retention element, including the flexible outward-extending projections and the retention bracket, for retaining a connection between the bumper and the frame member.

Regarding the exemplary system 110 of FIG. 11, this operation, function, or process of the retention feature 118, to maintain connection between the bumper element 114 and the frame structure 116 in the event of an impact event, is shown and described further in connection with FIG. 19.

Parts (e.g., crush member 112) of the system 110 of FIG. 11 can otherwise be the same as analogous components (e.g., crush member 62, 72, etc.) described herein.

FIG. 12

Figure 4:
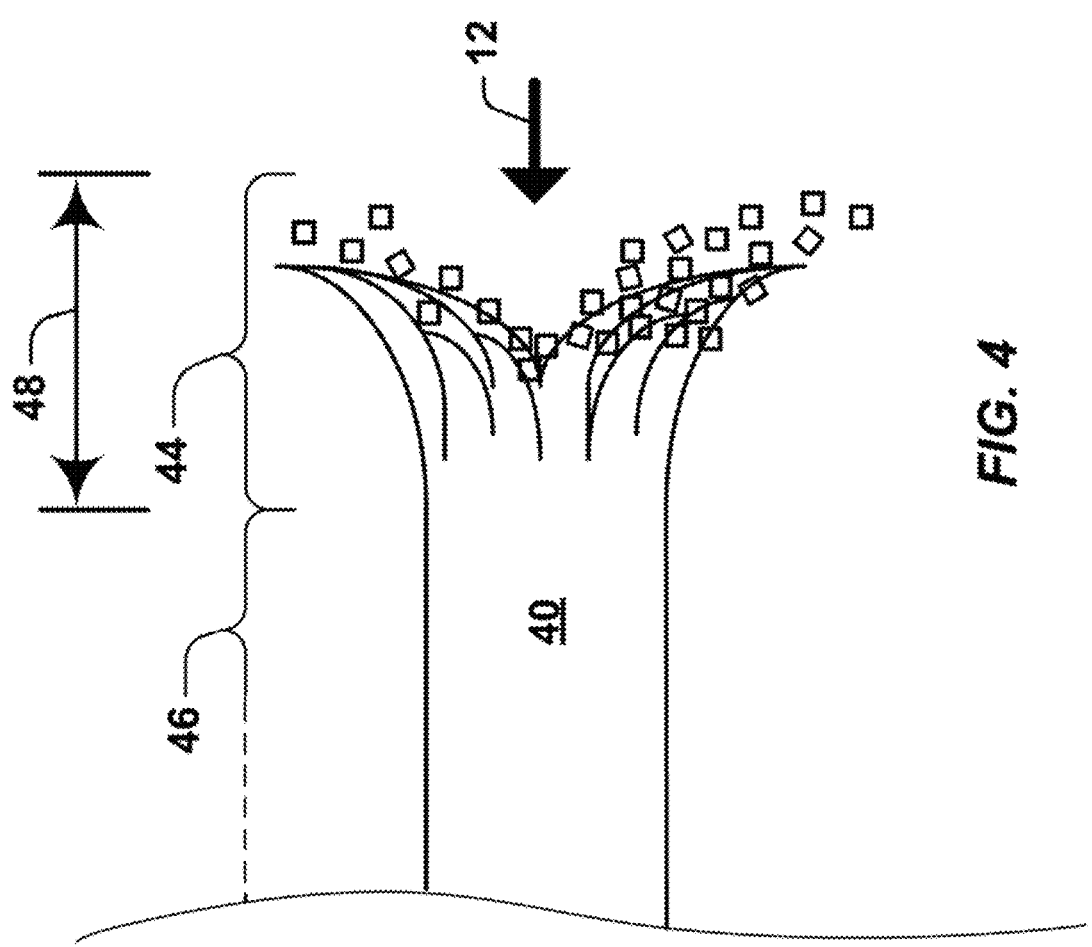
FIG. 4 illustrates a crush member, made of a high-performance composite, fragmenting to absorb energy from an impact.
Figure 12:
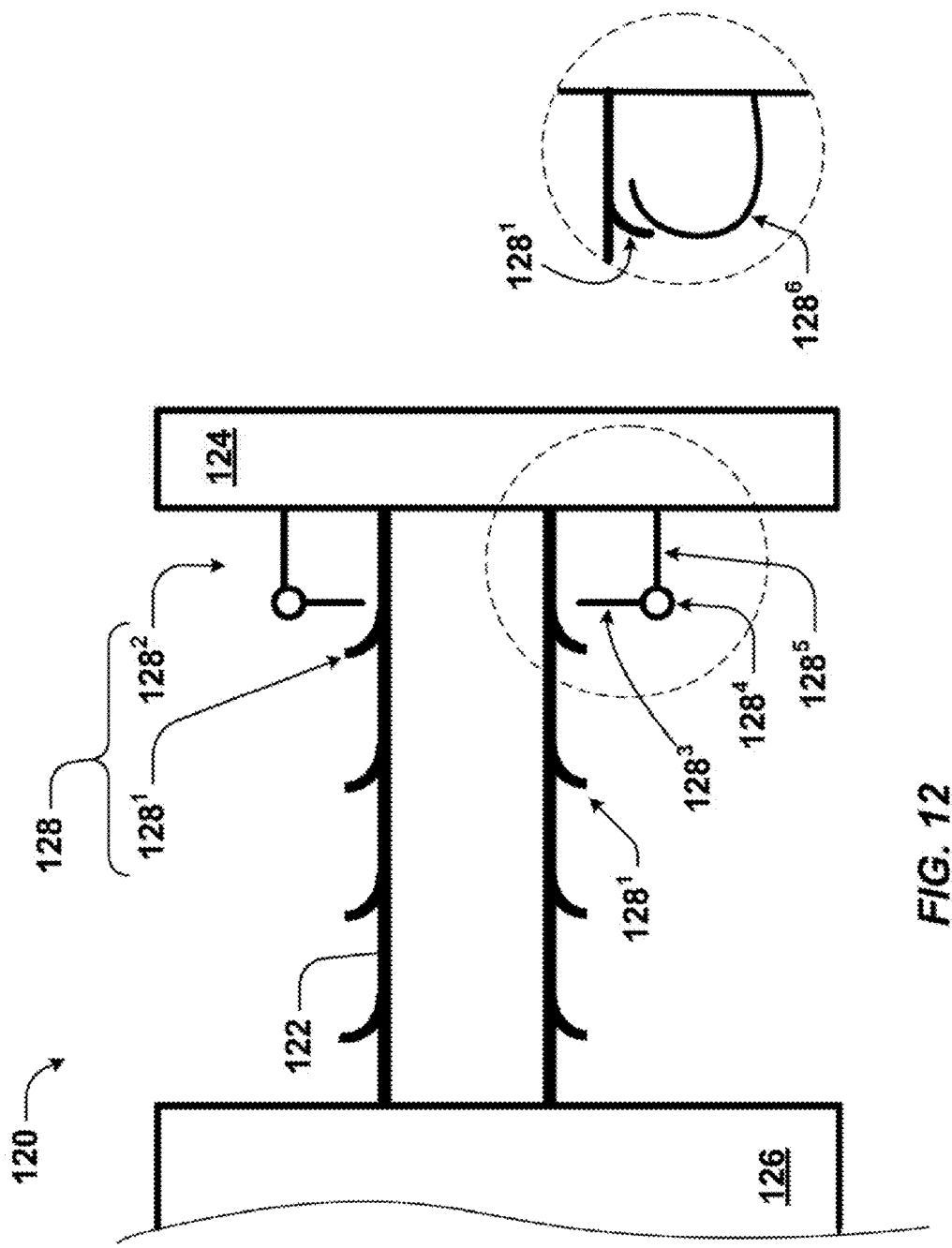
FIG. 12 illustrates schematically a particular example of a bumper system like that of FIG. 6, prior to an impact event, wherein the retention element includes non-flexible outward-extending projections and a retention bracket having movable walls.

FIG. 12 illustrates schematically a particular embodiment of a bumper system 120, like the system 60 of FIG. 4, prior to an impact event. In this embodiment, the retention element 68 (FIG. 6) includes non-flexible outward-extending projections 128$^1$ and a retention bracket 128$^2$ having movable (e.g., hinged) flap 128$^3$, referenced collectively by reference numeral 128.

The embodiments of FIG. 12 are like those of FIG. 11 except that a described retention bracket or trap 128$^2$ of the embodiment of FIG. 12 is hinged, flexible, or otherwise movable, between a first disposition and a second disposition, compared to the rigid trap 118$^2$ of FIG. 11.

The trap 128$^2$ of FIG. 12 can be movable by having a hinged or otherwise moveable door, wall, or flap 128$^3$. As shown in FIG. 12, the flap 128$^3$ is connected by a hinge 128$^4$ to a base wall or portion 128$^5$ of the trap 128$^2$. In one embodiment, the hinge is a one-way hinge, allowing rotation in a first direction, but not in the opposite direction.

As described in connection with the embodiment of FIG. 11 and below regarding the present and related embodiments in connection with FIGS. 19-21, the trap 128$^2$ operates to maintain a connection between the crush member 122 and at least one adjacent part to which the trap 128$^2$ is connected— i.e., the bumper element 124 in FIG. 12 or frame structure 126 in a contemplated embodiment.

Generally, the trap $128^2$ is configured to be (a) movable or flexible enough in a first direction so that at least a distal portion thereof (e.g., the flap $128^3$) can be easily displaced, by contact with one of the projections $128^1$, during an impact event, but (b) inflexible or rigid enough in the opposite direction to keep the projection $128^1$ from passing the trap $128^2$ again.

FIG. 12 also calls out by dotted circle an optional embodiment wherein a trap $128^6$ is configured to be movable, without having a hinge, due to its shape, size, and material. The optional trap $128^6$ can have, e.g., a bowed shape allowing the trap $128^6$ to be, similar to the first trap $128^2$, (a) movable or flexible enough in a first direction so that at least a distal portion thereof can be easily displaced, by contact with one of the projections $128^1$, during an impact event, but (b) inflexible or rigid enough in the opposite direction to keep the projection $128^1$ from passing the trap $128^6$ again.

Due to the flexibility of the trap $128^2/128^6$ in the embodiments of FIG. 128, the relevant projections $128^1$ (relevant projection being those expecting to come, or coming, in contact with the trap) do not need to be flexible to enable the projections $128^1$ to pass into the trap $128^2/128^6$. The projections $128^1$ are not limited to being rigid, though, and can be flexible to an extent. Each relevant projection $128^1$ should have sufficient rigidity to keep the projection $128^1$ from bending back so much that clearance is created allowing the trap wall $128^3/128^6$ to move pass the projection $128^1$, and thereby allow the projection $128^1$ to come out of the trap $128^2/128^6$ and so possibly thereby also allow the crush member, having the projection $128^1$, to disconnect from the adjacent part to which the trap is connected—i.e., the bumper element 124 or frame structure 126.

The projections $128^1$ in various embodiments include any one or more of a wide variety of materials without departing from the scope of the present disclosure. In some embodiments, the projections $128^1$ include a flexible material such as a metal (e.g., metal alloy), plastic, or a rubber connected to the crush member 122.

The projection $128^1$ can be bonded, molded, or melded to the crush member 122, for instance. In some embodiments, such as when the projections $128^1$ include bumps, the projections $128^1$ include the same material forming the crush member 122. In these embodiments, the projections $128^1$ can be formed integrally with the crush member 122, such as in a mold, or formed separate from and connected to the crush member 122.

Generally, the material of the relevant projections $128^1$ are limited only to those that would, assuming an appropriate projection shape, (i) allow the projection to pass into the trap $128^2/128^6$ when the projection and trap have a first direction of relative motion between them, during an impact event, and (ii) keep the projection from moving out of the trap $128^2/128^6$, following the impact event, while the projection and/or the trap may try to move, e.g., in a second relative direction with respect to each other.

Regarding shape of the projections, each relevant projection $128^1$ is limited only to shapes that have an ability to, assuming an appropriate projection material, (i) allow the projection to pass into the trap $128^2/128^6$ when the projection and trap have a first direction of relative motion between them, during an impact event, and (ii) keep the projection from moving out of the trap $128^2/128^6$, following the impact event, while the projection and the trap may try to move in a second relative direction with respect to each other.

Although relevant projections $128^1$ can have other shapes without departing from the scope of the present invention, in some embodiments, each relevant projection $128^1$ has a shape selected from a list of shapes consisting of an elongated-curve shape, as shown in FIG. 12, a bump shape, and an elongated straight shape. Elongated projections $128^1$ extend at an angle from a surface of the crush member 122. The angle can have any of a wide variety of values without departing from the scope of the present disclosure.

In one embodiment, elongated projections $128^1$ extend from the crush member 122 surface at an angle of about 90 degrees, or at generally a right angle. In one embodiment, the projections 128 extend from the crush member surface at any angle between about 0 degrees and about 90 degrees in either direction (i.e., between about 0 and about 180 degrees across the surface of the bumper element 122). In some embodiments, having elongated projections $128^1$, it is preferred that the projections are, in a pre-impact event state of the system 120, angled away from the trap $128^2/128^6$ that they are configured to engage, as shown in the embodiment of FIG. 12.

As referenced above, the crush member is in some embodiments configured and/or arranged to facilitate a specific failure scenario, such as by being stronger in some portions and not others, thereby allowing for failure at the weaker portions before stronger portions. As an example, if it is desired for the crush member 122 to fail (e.g., fragment and/or splay) at the first end before other parts of the member, a trigger feature may be provided (e.g., bevel and/or scoring).

Generally, each retention element (generally identified by reference numeral 68 in FIG. 6) is, as also provided, configured, sized, shaped, and positioned within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 20:
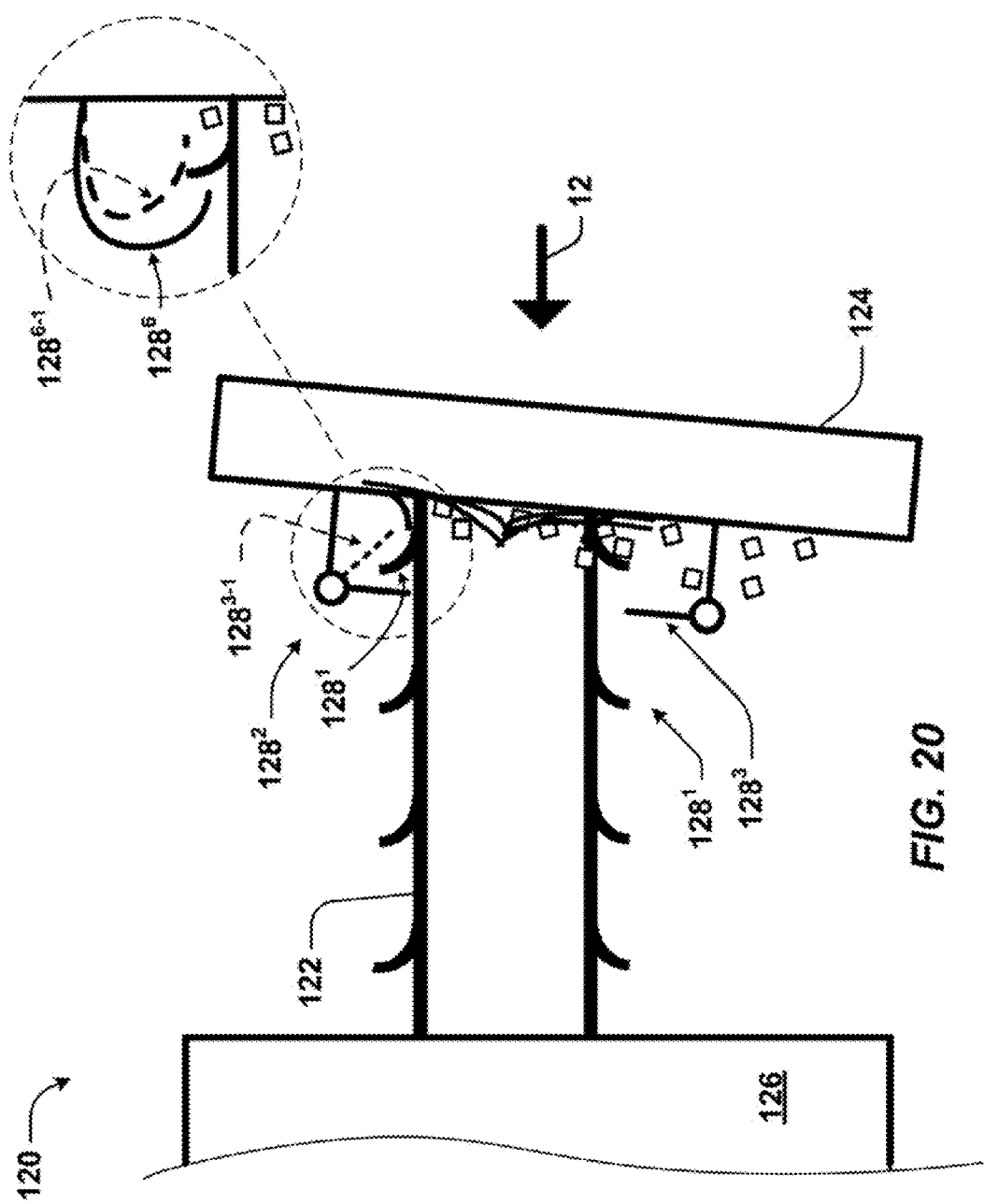
FIG. 20 illustrate schematically the system of FIG. 12, following the impact event causing the composite to fail, showing performance of the retention element, including the non-flexible outward-extending projections and the retention bracket having movable flaps, for retaining a connection between the bumper and the frame member.

Regarding the exemplary system 120 of FIG. 12, this operation, function, or process of the retention feature 128, to maintain connection between the bumper element 124 and the frame structure 126 in the event of an impact event, is shown and described further in connection with FIG. 20.

Parts (e.g., the crush member 122) of the system 120 of FIG. 12 can otherwise be the same as analogous components (e.g., the crush members 62, 72, 82, etc.) described herein.

FIG. 13

Figure 13:
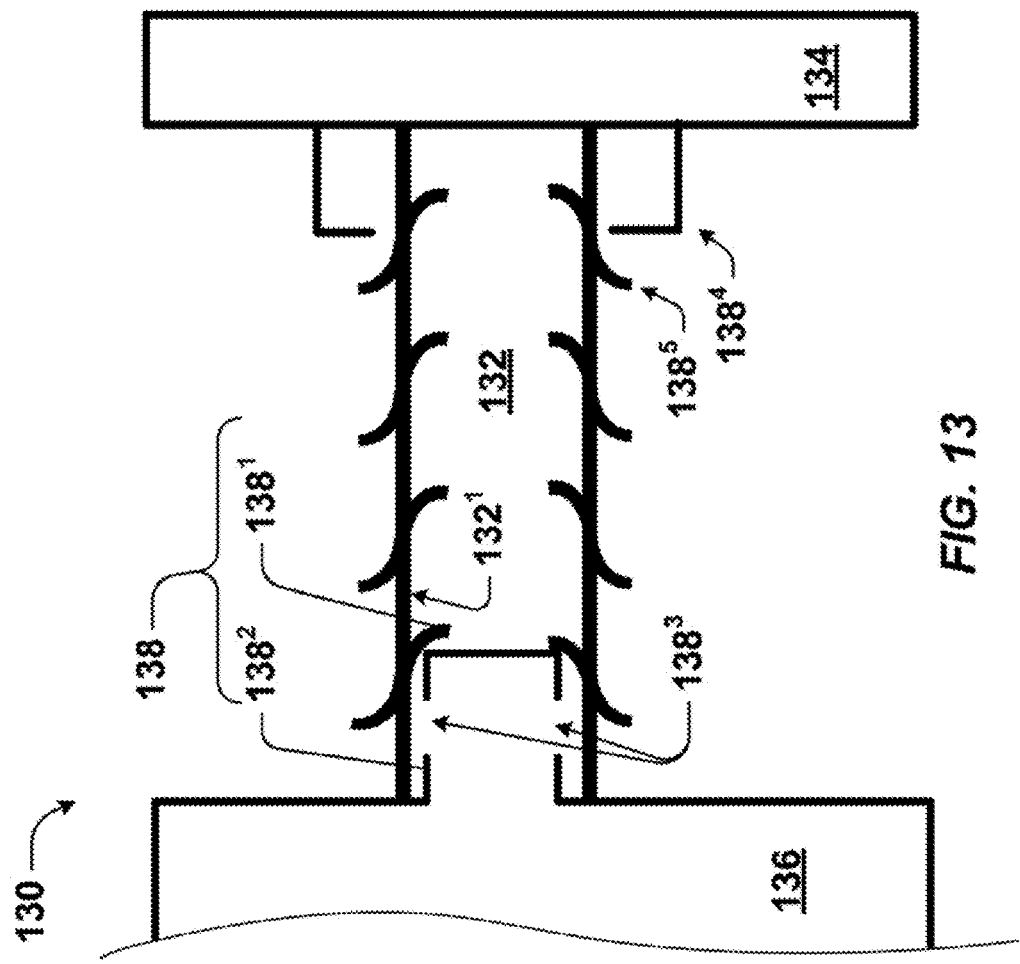
FIG. 13 illustrates schematically a particular example of a bumper system like that of FIG. 6, prior to an impact event, wherein the retention element includes a slotted frame member for receiving flexible projections extending inwardly from an inner wall of the crush member.

FIG. 13 illustrates schematically a particular embodiment of a bumper system 130, like the system 60 of FIG. 6, prior to an impact event. In this embodiment, the retention element 68 (FIG. 6) includes a slotted trap subsystem 138 for receiving flexible projections $138^1$ extending inwardly from an interior wall $132^1$ of the crush member. The retention element of this embodiment is referenced generally by reference numeral 138.

In the embodiment of FIG. 13, an interior trap $138^2$ extends from at least one of the frame structure 136 and the bumper element 134 and is configured to receive inwardly-extending projections $138^1$. In the example embodiment of FIG. 13, the interior trap $138^2$ extends from the frame structure 136. The figure is considered to also inherently show an identical trap extending in an opposite direction, from the bumper member 134.

In some embodiments, the trap $138^2$ is connected to the relevant structure(s) adjacent the crush member 132—i.e., the frame structure 136 and/or the bumper element 134. In some embodiments, the trap $138^2$ is a part of (e.g., formed integrally with) the relevant structure(s) adjacent the crush member 132—i.e., the frame structure 136 and/or the bumper element 134.

The internal trap $138^2$ has at least one slot, depression, hole, or the like, generally identified by reference numeral $138^3$ and referred to for ease of description as a slot $138^3$. The internal trap $138^2$, including the slot(s) $138^3$, are configured (e.g., sized, shaped, positioned) to receive at least one of the internal protrusions $138^1$ during an impact event causing a shift of the crush member 132, and so movement of relevant protrusion(s) $138^1$ into the slot(s) $138^3$.

As also shown in FIG. 13, the bumper-retention system 130, and more particularly the retention element 68, in some embodiments includes an external trap $138^4$, being like any the external traps of the embodiments of FIG. 11 and FIG. 12. As with those embodiments, the external trap $138^4$ of FIG. 13 is configured to receive an external protrusion $138^5$.

As referenced above, the crush member 132 is in some embodiments configured and/or arranged to facilitate a specific failure scenario, such as by being stronger in some portions and not others, thereby allowing for failure at the weaker portions before stronger portions. As an example, if it is desired for the crush member 132 to fail (e.g., fragment and/or splay) at the first end before other parts of the member, a trigger feature may be provided (e.g., bevel and/or scoring).

As provided, generally, each retention element (generally identified by reference numeral 68 in FIG. 6) is, as also provided, configured, sized, shaped, and positioned within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Figure 21:
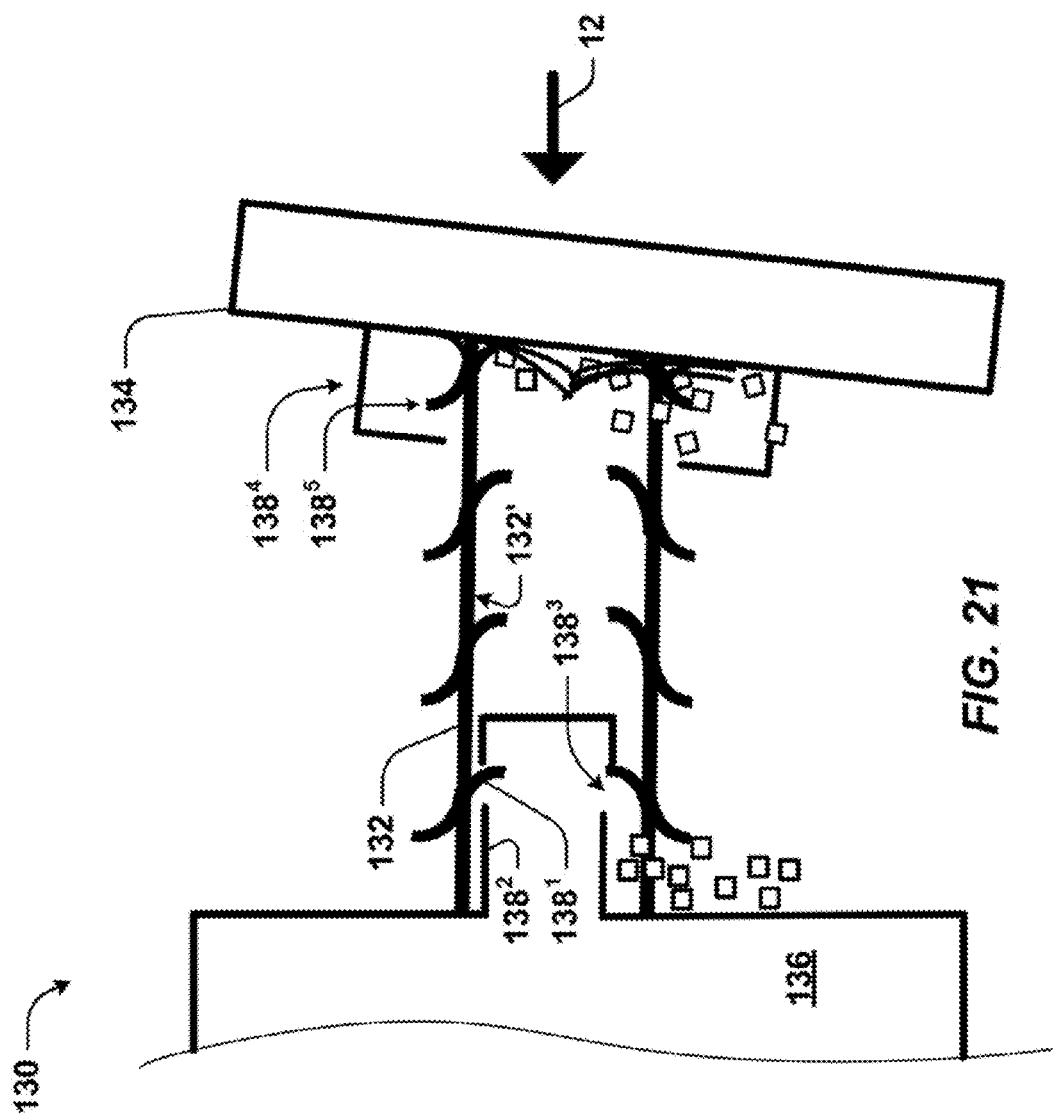
FIG. 21 illustrate schematically the system of FIG. 13, following the impact event causing the composite to fail by fragmentation, showing performance of the retention element, including the slotted frame member for receiving flexible projections extending inwardly from the wall of the crush member, for retaining a connection between the bumper and the frame member.

Regarding the exemplary system 130 of FIG. 13, this operation, function, or process of the retention feature 138, to maintain connection between the bumper element 134 and the frame structure 136 in the event of an impact event, is shown and described further in connection with FIG. 21.

Parts (e.g., the bumper element 134, the traps $138^2$/$138^4$, etc.) of the system 130C of FIG. 13 can otherwise be the same as analogous components (e.g., the bumper element 114 and the trap $118^2$, of FIG. 11, etc.) described herein.

FIG. 14

Figure 14:
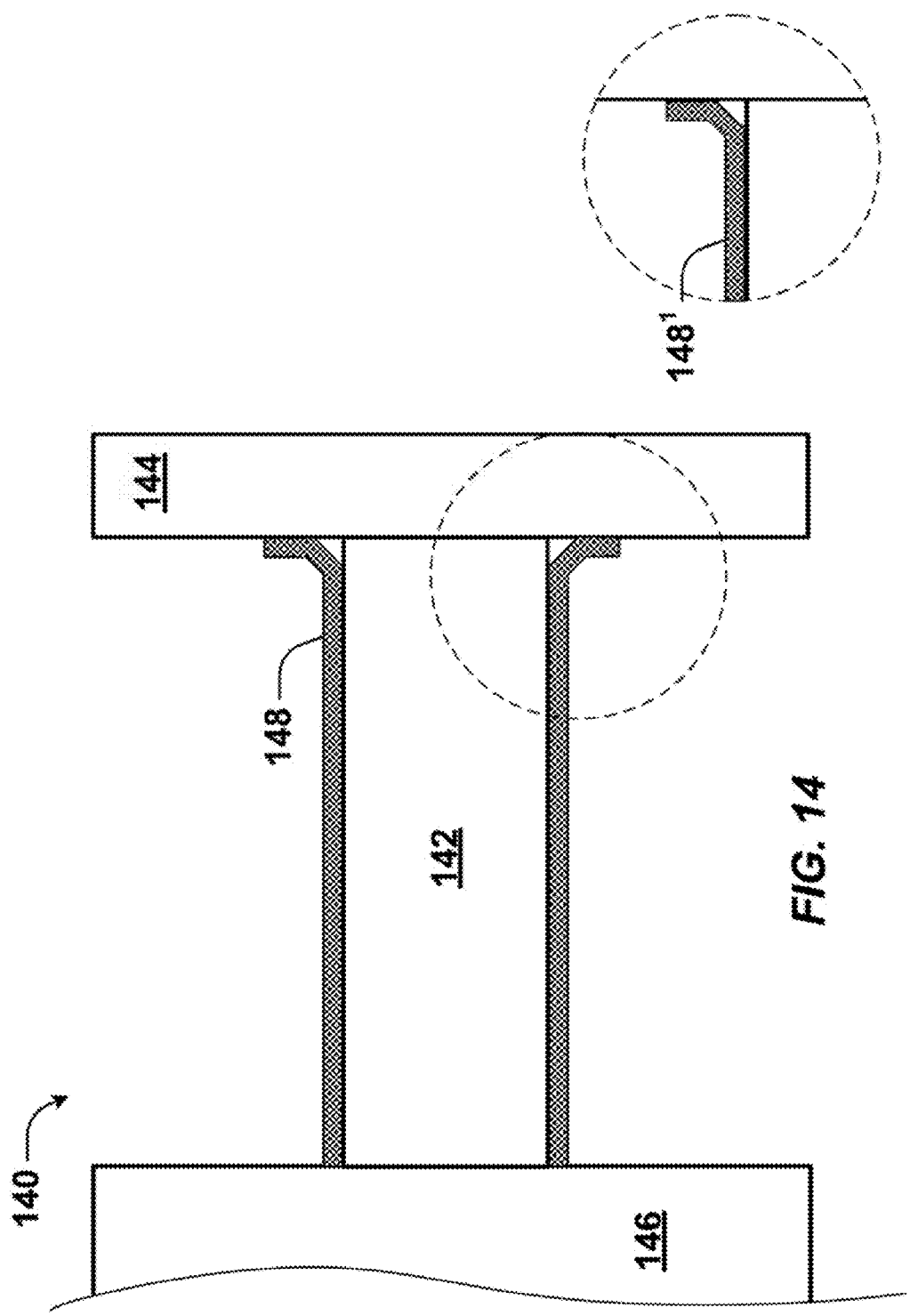
FIG. 14 illustrates schematically a particular example of a bumper system like that of FIG. 6, prior to an impact event, wherein the retention element includes a strap or sash component.

FIG. 14 illustrates schematically a particular embodiment of a bumper system 140, like the system 60 of FIG. 6, prior to an impact event. In this embodiment, the retention element 68 (FIG. 6) includes at least one strip, sash, or strap component 148 (referred to, in a non-limiting way, generally herein as a strap component or simply a strap).

The strap component 148 is connected to the crush member 142. As shown in FIG. 14, the strap component 148 can extend all the way to contact the frame structure 146. In a contemplated embodiment, the strap member 148 does not extend all the way to the frame structure 146.

The strap component 148 extends to the bumper element 144. The strap component 148 also connects to the bumper element 144 in such a way that the strap component 148 maintains a connection between the crush member 142 and the bumper element 144 through an impact event causing the crush member to be at least partially destroyed.

As shown in primary illustration of FIG. 14, the strap component 148 can be positioned on an external surface of the crush member 142. FIG. 14 also calls out by dotted circle an optional embodiment wherein an alternate strap component $148^1$ is attached to an internal surface of the crush member 142. In this contemplated embodiment, the strap component $148^1$, like that of the primary illustration of FIG. 14, extends to the bumper element 144 and connects to the bumper element 144 in such a way that the strap component $148^1$ maintains a connection between the crush member 142 and the bumper element 144 through an impact event causing the crush member to be at least partially destroyed. In a further contemplated embodiment, the system 140, and more particularly the retention element 148, includes both one or more external strap components 148 and one or more internal strap components $148^1$.

As provided above, the crush member 142 can include features such as flanges (shown schematically by reference numeral 69 in FIG. 6). And the straps are in various embodiments positioned on and/or adjacent such flanges.

The straps 148/$148^1$ can have any of a variety of sizes and materials without departing from the scope of the present disclosure. While the straps 148/$148^1$ can include other materials, in some embodiments, the straps, include at least one of a plastic, a rubber, a polymer, and a synthetic material.

In one embodiment, the straps 148/$148^1$ include metal, such as a perforated metal, or heavy screening or metal. In one embodiment, the straps 148/$148^1$ are bonded to the crush member, such as to flanges of the crush member, and in one embodiment, molded in place on the crush member.

In a particular embodiment, the molding process includes resin transfer molding. Such resin transfer molding could include dry fibers (e.g., glass or carbon) being preplaced into a mold and the mold being closed. A liquid thermosetting resin (epoxy, for example) is then injected into the mold so that it flows through the dry fibers, filling the mold before curing the composite to a rigid solid. The strap could be pre-placed into the mold along with the fibers. This can be referred to as insert molding where, in this case, the metal strap is the insert.

The strap component 148 can be connected to the bumper element 144 in one or more of a variety of ways. Although the strap 148 can be connected to the bumper 144 in other ways without departing from the scope of the present technology, in some embodiments, the strap is connected to the bumper element 144 by weld, rivet, screw, nut and bolt, other mechanical fastening, industrial glue or adhesive (e.g., adhesive bonding), other bonding, melding, fusion such as by melting, others, or the like.

In a contemplated embodiment, the strap 148 is connected to the bumper element 144 and the frame structure 146 in such a way that these connections are not broke in response to an impact event. In this arrangement, connection between the bumper element 144 and the frame structure 146 is maintained even if a connection between the strap and the crush member 142 is lost. In a particular contemplated embodiment, the strap 148 is not connected to the crush member 142.

As provided, each retention element (generally identified by reference numeral 68 in FIG. 6) is configured (e.g., having a size, shape, position, and material) within the system (60, generally) to ensure connection between a frame structure (66, generally) and a bumper member (64, generally) despite the crush member (62, generally) being at least partially destroyed by the impact event in a way that compromises connection between the crush member and one or both of the bumper member and the frame structure.

Regarding the exemplary system 140 of FIG. 14, this operation, function, or process of the strap component 148, to maintain connection between the bumper element 144 and the frame structure 146 in the event of an impact event, is shown and described further in connection with FIG. 22.

Parts (e.g., crush member 142) of the system 140 of FIG. 14 can otherwise be the same as analogous components (e.g., crush member 62, 72, 82, 92, etc.) described herein.

FIG. 15

FIG. 15 illustrates schematically the system of FIG. 7, following the impact event represented generally by the arrow marked by reference numeral 12. The impact 12 causes the bumper element to press against the crush member 72 (e.g., composite) thereby causing the crush member to fail, such as by fragmenting and/or splaying.

In FIG. 15, crush-member fragments and/or debris 150 are represented by reference numeral 150. By this fragmenting failure mechanism, a connection between the crush member 72 and the bumper element 74 is lost. In embodiments in which the crush member 72 is configured also, or alternatively, to fail at a second end of the crush member 72, adjacent the frame structure 76, the fragmentation at that end would cause a connection there, between the crush member 72 and the frame structure to be lost. A potential fragmentation at the second end is not shown in detail, but considered to be constructively shown by the description and the illustration of fragmentation at the first end of the member 72.

In any event, and as shown in FIG. 15, pre-existing connections between the spring retention element 78 and the frame structure at one end of the spring element, and the spring retention element 78 and the bumper element 74, at the other end of the spring element 78 are maintained in connection with (e.g., through and after) the impact event. These connections ensure that the bumper element 74 does not separate from the frame structure 76.

As provided, in some embodiments, it is preferred that the system 70 be configured so that the retention element maintains a close connection between the bumper element and the frame structure. This applies to each embodiment herein (e.g., those of FIGS. 8-14), as well.

The embodiment of FIG. 15 operates similarly using a spring retention element 78. Despite the crush member 72 failing, by splaying or peeling back in the case of FIG. 15, and disconnecting from the bumper element 74 (and/or the frame structure 76, in particular embodiments), the pre-existing connections between the spring retention element 78 and the frame structure 76 at one end of the spring element 78, and the spring retention element 78 and the bumper element 74, at the other end of the spring element 78 are maintained through and after the impact event. Again, these connections ensure that the bumper element 54 does not separate from the frame structure 76.

FIGS. 16

FIG. 16 illustrates schematically the system of FIG. 8, following the impact event represented generally by the arrow marked by reference numeral 12. The impact event causes the composite to fail, such as by fragmentation and/or splaying.

In FIG. 16, bumper-element fragments or splaying is shown by reference numeral 160. By the failure mechanism, a connection between the crush member 82 and the bumper element 84 is lost. In embodiments in which the crush member 82 is configured also, or alternatively, to fail at a second end of the crush member 82, adjacent the frame structure 86, the fragmentation at that end would cause a connection there, between the crush member 82 and the frame structure to be lost (fragmentation at the second end is not shown in detail, but considered to be constructively shown by the description and the illustration of fragmentation at the first end of the member 82).

In any event, and as shown in FIG. 16, pre-existing connections between the retention element 88 and the frame structure at one end of the retention element, and the retention element 88 and the bumper element 84, at the other end of the retention element are maintained through and after the impact event. These connections ensure that the bumper element 84 does not separate from the frame structure 86.

As provided above in connection with FIG. 8, the retention element 88 can include the retraction feature $88^1$. And the retractable nature of the component 88 can be effected by any of a variety of features $88^1$, such as the coiled or tension-spooled feature $88^1$ (e.g., wound spring) shown in FIGS. 8 and 16 or tension feature described in connection with FIG. 8. The retractable feature $88^1$ (e.g., coiled and/or tension feature) is configured and arranged to take up any slack that is already present or created, or would otherwise be created, in response to an impact event, in an extended portion $88^2$ of the component 88.

When material of the crush element 82 is displaced by the failure mechanism (e.g., fragmenting and/or splaying), the bumper element 84 can then move toward the frame structure 86, and so the body of the retention element 88 contracts, in an original biasing direction, to pull the bumper 84 toward the frame 86. And in any event, the retention element 88 maintains connection between the bumper 84 and the frame 86.

FIGS. 17

FIG. 17 illustrates schematically the system of FIG. 9, following the impact event represented generally by the arrow marked by reference numeral 12. The impact causes the composite to fail, such as by fragmentation and/or splaying.

The guide components 98 are configured (e.g., have a size, shape, and material) to engage the crush member 92, as shown in FIG. 17, in case of an impact event. The configuration includes the components extending along a length of the crush member 92. A length $92^3$ (shown in FIG. 9) of the guide components $98^1$, $98^2$ is designed to be sufficient to ensure contact with the crush member 92 (e.g., the exterior surface $92^1$) after an expected amount of the crush member 92 is fragmented.

In one embodiment, (i) the guide members 98 extend from an adjacent part (the bumper element 94 or the structure frame 96), at a first end of the crush member 92, toward an opposite second end of the crush member 92, and (ii) the crush member 92 is configured to fail at least said first end of the crush member 92.

And as provided, in a contemplated embodiment (not shown expressly, but to be considered shown constructively by the present description and FIGS. 9 and 17), one or more guide components 98 are positioned (not shown in detail) in an interior $92^2$. Under this arrangement, in case of a crash event, and fragmentation of the crush member 92 adjacent the guide members 98, one or more of such internal guide members 98 engage the inner surface $92^3$ of the crush member for maintaining a connection between the crush member 92 and the part (e.g., bumper element 94 or frame structure 96), and so between the frame structure 96 and the bumper element 94.

In some embodiments, corresponding to an expectation that the damaged area or crush zone of the composite crush member will extend only about an inch or two, the guide members 98 have a similar length (of about an inch or two) thereby being long (extending far enough from the face of the bumper beam) to engage the crush member and ensure connection between the bumper beam and crush member so the crush member does not fall away form the system 90.

In some embodiments, the system 90 is configured so that at least one of the guide members 98 operates to catch, hold, or otherwise engage at least some of the crush-member splayed and/or fragmented material.

While elongate guides 98 are shown (squared or rounded) in FIGS. 9 and 17, the guides 98 are in one embodiment generally U-shaped (like a croquet wicket (hoop)). The ends of the U shape can connected to the bumper beam, or the rounded end of the U shape can be connected to the bumper beam. This embodiment is considered to be shown schematically (e.g., shown in profile or side view) by FIGS. 9 and 17. A benefit of this embodiment is that the guides would allow the splaying fibers to pass through the U-shape (e.g., like a ball passing through a croquet wicket). The fibers passing through the U shape in some cases foster connection between the bumper beam and the composite member by the splayed fibers engaging (e.g., entwining, pressing against, otherwise engaging, etc.) the guide.

In some embodiments, (e.g., regarding the catching features of the arrangements of FIGS. 9-14), the system is configured to accommodate the catching function, such as by sizing, shaping, and/or positioning of the relevant features for catching a certain amount of debris. These relevant features include, e.g., the guide members, the crush member, and the bumper element (or the frame structure in alternate embodiments described below) of FIG. 9, and, as described below, the bumper element (or frame structure in the alternate embodiments) in FIG. 10 and retention brackets or traps adjacent the bumper element (or frame structure in alternate embodiments) in FIGS. 11-13.

FIG. 18

FIG. 18 illustrates schematically the system of FIG. 10, following the impact event represented generally by the arrow marked by reference numeral 12. The impact causes the composite to fail, such as by fragmentation and/or splaying.

The retention element 108 includes an opening $108^1$ in the bumper element 104 and an end $108^2$ of the crush member 102. As provided, the opening $108^1$ can be initially covered, such as by a thin film configured (e.g., having a thickness small enough and a material selected) to break relatively easily so that the crush member 102 does not fail against (by engagement against) the relatively-thin cover. In some embodiments, the opening, covered or not, is present also or instead, in the frame structure 106. The relevant part, having the opening, being the bumper element 104, is shown in FIGS. 10 and 18. The relevant part being the frame structure 106 is not shown in detail, but considered constructively shown by the figures and descriptions herein.

Upon the impact event, any connections between the crush member 102 and the relevant part (bumper element 104 and/or frame structure 106) are broken during the impact event. This can occur due to failure of the crush member 102 at or adjacent the connections and/or due to failure of an aspect of the connection other than crush member material. The relevant part can be one or both of the bumper element 104, as in FIGS. 10 and 18, and the frame structure 106 in an embodiment considered constructively shown by the figures and descriptions herein.

The system 100 can be configured so that, when there is splaying of the crush member 102, splaying parts (e.g., fronds) can, formed by the splayed/splaying member 102, are retention features, acting to engage the bumper element 102, such as at edges of the opening $108^1$ of the bumper element 102. This operation can occur also with connection to the frame structure 106 (e.g., fronds engage the frame structure 106) for embodiments in which an opening is at the frame 106, also or instead of at the bumper 104.

In some embodiments, the system 100 is configured so that the relevant part—i.e., bumper, as shown in FIG. 18, or the frame structure, operates to catch and hold at least some of the crush-member debris resulting from the fragmenting failure. As shown in FIG. 18, the relevant part, e.g., the bumper element 104, can include an inner compartment 1901 being configured to catch and hold at least some of the debris.

FIG. 19

FIG. 19 illustrates schematically the system of FIG. 11 following the impact event represented generally by the arrow marked by reference numeral 12. The impact causes the composite to fail, such as by fragmentation and/or splaying, both as shown by FIG. 19.

In the impact event, the crush member 112 fails as designed causing the crush member to shorten. As the member 112 shortens, and the bumper element 114 is pushed by the impact toward the frame structure 116, the trap $118^2$ moves, with the bumper element 114 along a remaining length of the crush member. As the trap $118^2$ moves with the bumper element 114, a trap flap or wall $118^4$ of the trap $118^2$ engages a projection $118^1/118^3$ causing the projection to bend toward the crush member 112.

Once the bumper element 114, and so the trap $118^2$, has moved a sufficient distance, the trap wall $118^4$ passes the projection $118^1/118^3$ and thus disengages from the projection $118^1/118^3$. With the trap wall $118^2$ no longer engaging the projection $118^1/118^3$, the projection returned toward its original position/shape.

As shown in FIG. 19, after the trap $118^2$ has moved (to the left in the figure) beyond the projection $118^1/118^3$, and the projection returns toward its original shape, the projection is positioned to keep the trap $118^2$, and so the bumper element 114, from moving back off of the crush member 112. If the bumper element 114 started to move this way (generally toward the right in the figure), then the trap wall $118^2$ will engage the projection $118^1/118^3$, which, while being configured to bend and allow the trap $118^2$ to pass when the trap is moving in the first direction, is configured to keep the trap from moving when the trap is moving in the second direction—i.e., configured to keep the projection $118^1/118^3$ in the trap $118^2$.

As provided, in some embodiments the trap $118^2$ is positioned on the frame 116. The operation of these embodiments is substantially the same as described just above for the embodiment in which the trap $118^2$ is on the bumper 114. In some embodiments, a trap is positioned on each of these relevant parts, the bumper and the frame. The crush member 112 is configured (e.g., having a size, shape and material, and position) to fail—e.g., fragment and/or splay, at an end or ends of the crush member 112 having the trap(s) $118^2$.

In some embodiments in which the crush member 112 is configured to fail at least in part by splaying, fronds of the splaying operate as retention features, such as by acting to engage, at least slightly, and in some instances, to a large degree, the trap 112 for ensuring connection between the crush member 112 and the relevant part—i.e., frame or bumper, connected to the trap.

In a contemplated embodiment, wherein the retention element 118 includes a trap $118^2$ and expected fronds of the crush member 112 due to crush member failure, protrusions $118^1$ are not needed because the trap and fronds of splaying are sufficient to maintain bumper-to-frame connection.

In some cases the protrusions are kept and the protrusions are considered as a backup, ensurance, feature in case the fronds to not fully hold the crush member to the trap as expected. In some cases the fronds are considered as a backup, ensurance, feature in case the protrusions do not fully hold the crush member to the trap as expected. In some cases, the protrusions are not present. For instance, FIGS. 11 and 12, without the protrusions, which embodiments are considered constructively shown by this description and the figures.

As with the embodiments of FIGS. 9 and 10, the system 110 can be configured to catch and hold at least some of the crush-member debris resulting from the fragmenting failure. As shown in FIG. 19, the relevant part, e.g., the bumper element 114 and/or the frame structure 116, can include an inner compartment 1901 being configured to catch and hold the some debris. In some embodiments, it is preferred that none or not too much debris is held so that held debris does not inhibit additional failure of (absorption of energy by) the crush member. This characteristic applies to each embodiment herein. E.g., each system describe herein can be configured to catch and hold some debris, though in some embodiments, it is preferred for that none or not too much debris is held to avoid inhibiting additional failure of the crush member.

FIG. 20

FIG. 20 illustrates schematically the system of FIG. 12 following the impact event represented generally by the arrow marked by reference numeral 12. The impact causes the composite to fail by fragmentation and/or splaying, as expressly shown in FIG. 20.

The embodiment of FIG. 20 is identical in most ways to that of FIG. 19. A primary difference is that the trap of the embodiment of FIG. 20 has a movable wall $128^3/128^6$. The trap wall $128^3/128^6$ is configured to move during the impact event to allow one or more of the projections $128^1$ to enter the trap $128^3/128^6$. FIG. 20 shows corresponding moved or flexed positions or states of the trap walls $128^3/128^6$, as identified by reference numerals $128^{3-1}/128^{6-1}$. The trap wall $128^3/128^6$ is configured not to move, though, in a way to allow the projection $128^1$ to exit the trap $128^2/128^6$. In these way, connection between the crush member 122 and the trap is created and maintained, and so connection between the bumper element and the frame structure.

An optional difference between the embodiments of FIGS. 19 and 20 is that the projections in the embodiment of FIG. 20 need not be flexible (though they can be to an extent), in order to facilitate passing of the projections into the trap $128^2/128^6$, because the trap $128^2/128^6$ is flexible as described to facilitate entry of the projections into the trap $128^2/128^6$.

FIG. 21

FIG. 21 illustrates schematically the system of FIG. 13 following the impact event represented generally by the arrow marked by reference numeral 12. The impact causes the composite to fail by fragmentation and/or splaying, as expressly shown in FIG. 21.

As shown in FIG. 21, slots $138^3$ of an internal retention feature $138^2$ are arranged to, in the case of an impact event, receive internal projections $138^1$ of the feature 138. The projections $138^1$ can be like any of those described herein, such as with respect to FIGS. 11-13, including the corresponding after-impact aspects. For example, the projections can have any of the materials and shapes described.

As provided, in some embodiments, the retention elements 98 include an external trap $138^4$, like that of the embodiments of FIGS. 11 and 12, to receive external projections $138^5$ from the crush member 132.

In one embodiment, the crush member 132, the internal trap $138^2$, and/or the external trap $138^4$ are configured to catch and hold debris resulting from crush member failure 132.

FIG. 22

FIG. 22 illustrates schematically the system of FIG. 14 following the impact event represented generally by the arrow marked by reference numeral 12. In the embodiment of FIG. 22, the crush member 142 is configured to fail, such as by fragmentation and/or splaying.

As also shown in FIG. 22, the retention element 148, including the at least one strap component 148, is configured (e.g., having material, size, shape, and connection (e.g., adhesive connection, bonded connection, etc.) to maintain a connection to the bumper element 144 during and after an impact event. The strap component 148 is also configured to maintain a connection to one or both of the crush member 142 and the frame structure 146. In this way, the strap component 148 ensures connection during and following an impact event, between the bumper 144 and the frame 146.

Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system, for controlling displacement of a vulnerable component in connection with an impact event at the system, comprising:
    a frame structure;
    the vulnerable component;
    a composite crush member connected to the frame structure and the vulnerable component, forming a first close connection between the composite crush member and the vulnerable component and a second close connection between the composite crush member and the frame structure, the composite crush member:
        comprising primarily a polymer composite; and
        being configured and arranged in the system to fail in a predetermined manner in response to the impact event; and
    a retention feature configured and connected to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system;
    wherein the retention feature comprises:
        an opening in a surface of the system, being an opening of the vulnerable component; and
        a projection extending from the composite crush member and being positioned adjacent the opening and configured and arranged in the system to, in connection with the impact event, engage an edge of the opening.

2. The system of claim 1, wherein the projection is configured and arranged on the composite crush member to, in connection with the impact event, engage the vulnerable component, at or adjacent the opening, for maintaining the first close connection, between the composite crush member and the vulnerable component during and after the event at the system.

3. The system of claim 1, wherein:
the opening in the surface of the system is a first opening in a first surface of the system, and the projection is a first projection;
the retention feature further comprises:
a second opening in a second surface of the system; and
a second projection extending from the composite crush member and being positioned adjacent the second opening and configured and arranged in the system to, in connection with the impact event, engage an edge of the second opening; and
the second opening is of the frame structure.

4. The system of claim 3, wherein the second projection is configured and arranged on the composite crush member to, in connection with the impact event, engage the frame structure, at or adjacent the second opening, for maintaining the second close connection, between the composite crush member and the frame structure during and after the event at the system.

5. A system, for controlling displacement of a vulnerable component in connection with an impact event at the system, comprising:
a frame structure;
the vulnerable component;
a composite crush member connected to the frame structure and the vulnerable component, forming a first close connection between the composite crush member and the vulnerable component and a second close connection between the composite crush member and the frame structure, the composite crush member:
comprising primarily a polymer composite; and
being configured and arranged in the system to fail in a predetermined manner in response to the impact event; and
a retention feature configured and connected to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system;
wherein the retention feature comprises:
a trap extending from a first surface of the system; and
a projection, extending from a second surface being of the composite crush member, and being configured and arranged on the composite crush member to, in connection with the impact event, engage the trap; and
wherein:
the first surface is of the vulnerable component;
the trap extends from the vulnerable component; and
the projection is configured and arranged on the composite crush member to, in connection with the impact event, engage the trap for maintaining the first close connection, between the composite crush member and the vulnerable component during and after the event at the system.

6. The system of claim 5, wherein the second surface, of the composite crush member, is an inner surface of the composite crush member.

7. The system of claim 5, wherein the trap includes a flexible wall configured to bend during the impact event allowing the projection to move into the trap.

8. The system of claim 7, wherein the trap includes a hinge rendering the wall flexible.

9. The system of claim 5, wherein the trap extends from the vulnerable component into an interior of the composite crush member.

10. The system of claim 5, wherein:
the trap is a first trap and the projection is a first projection;
the retention feature further comprises:
a second trap extending from a third surface of the system; and
a second projection extending from a fourth surface being of the composite crush member, the second projection being configured and arranged on the composite crush member to, in connection with the impact event, engage the second trap;
the third surface is of the frame structure, and the second trap extends from the frame structure; and
the second projection is configured and arranged on the composite crush member to, in connection with the impact event, engage the second trap for maintaining the second close connection, between the composite crush member and the frame structure during and after the event at the system.

11. The system of claim 10, wherein the fourth surface, of the composite crush member, is an inner surface of the composite crush member.

12. The system of claim 10, wherein the second trap extends from the frame structure into an interior of the composite crush member.

13. The system of claim 10, wherein the second trap includes a flexible wall configured to bend during the impact event allowing the projection to move into the second trap.

14. The system of claim 13, wherein the second trap includes a hinge rendering the wall flexible.

15. A system, for controlling displacement of a vulnerable component in connection with an impact event at the system, comprising:
a frame structure;
the vulnerable component;
a composite crush member connected to the frame structure and the vulnerable component, forming a first close connection between the composite crush member and the vulnerable component and a second close connection between the composite crush member and the frame structure, the composite crush member:
comprising primarily a polymer composite; and
being configured and arranged in the system to fail in a predetermined manner in response to the impact event; and
a retention feature configured and connected to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system;
wherein the retention feature comprises:
an opening in a surface of the system; and
a connection between an end of the composite crush member and the system at or adjacent the opening; and
wherein:
the opening is of the vulnerable component; and
the connection is between the end of the composite crush member and the vulnerable component at or adjacent said opening.

16. The system of claim 15, wherein:
the surface is a first surface; and
the retention feature further includes a projection that extends from a second surface being of the composite crush member and is configured and arranged on the composite crush member to, in connection with the impact event, engage the vulnerable component, at or adjacent the opening, for maintaining the first close connection.

17. The system of claim 15, wherein:
the opening is a first opening, the end is a first end, the connection is a first connection, and the surface is a first surface;
the retention feature further comprises:
a second opening in a second surface of the system; and
a second connection between a second end of the composite crush member and the system at or adjacent the second opening; and
the second opening is of the frame structure; and
the second connection is between the second end of the composite crush member and the frame structure at or adjacent said second opening.

18. The system of claim 17, wherein:
the retention feature further includes a projection that extends from a third surface being of the composite crush member and is configured and arranged on the composite crush member to, in connection with the impact event, engage the frame structure, at or adjacent the second opening, for maintaining the second close connection.

19. A system, for controlling displacement of a vulnerable component in connection with an impact event at the system, comprising:
a frame structure;
the vulnerable component;
a composite crush member connected to the frame structure and the vulnerable component, forming a first close connection between the composite crush member and the vulnerable component and a second close connection between the composite crush member and the frame structure, the composite crush member:
comprising primarily a polymer composite; and
being configured and arranged in the system to fail in a predetermined manner in response to the impact event; and
a retention feature configured and connected to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system;
wherein the retention feature comprises:
a trap extending from a first surface of the system; and
a projection, extending from a second surface being of the composite crush member, and being configured and arranged on the composite crush member to, in connection with the impact event, engage the trap; and
wherein:
the first surface is of the frame structure, and the trap extends from the frame structure;
the projection is configured and arranged on the composite crush member to, in connection with the impact event, engage the trap for maintaining the second close connection, between the composite crush member and the frame structure during and after the event at the system; and
the second surface, of the composite crush member, is an inner surface of the composite crush member.

20. A system, for controlling displacement of a vulnerable component in connection with an impact event at the system, comprising:
a frame structure;
the vulnerable component;
a composite crush member connected to the frame structure and the vulnerable component, forming a first close connection between the composite crush member and the vulnerable component and a second close connection between the composite crush member and the frame structure, the composite crush member:
comprising primarily a polymer composite; and
being configured and arranged in the system to fail in a predetermined manner in response to the impact event; and
a retention feature configured and connected to the vulnerable component and to the frame structure to, in operation of the system, maintain at least one of the first close connection, between the composite crush member and the vulnerable component, and the second close connection, between the composite crush member and the frame structure, during and immediately following the composite crush member failing in the predetermined manner in response to the impact event at the system;
wherein the retention feature comprises:
a trap extending from a first surface of the system; and
a projection, extending from a second surface being of the composite crush member, and being configured and arranged on the composite crush member to, in connection with the impact event, engage the trap; and
wherein:
the first surface is of the frame structure, and the trap extends from the frame structure;
the projection is configured and arranged on the composite crush member to, in connection with the impact event, engage the trap for maintaining the second close connection, between the composite crush member and the frame structure during and after the event at the system; and
the trap includes a flexible wall configured to bend during the impact event allowing the projection to move into the second trap.

21. The system of claim 20, wherein the second trap includes a hinge rendering the wall flexible.

* * * * *